(12) United States Patent
Marston

(10) Patent No.: US 7,973,796 B1
(45) Date of Patent: Jul. 5, 2011

(54) NATURAL FRAMING SYSTEM

(75) Inventor: Michael J. Marston, Raleigh, NC (US)

(73) Assignee: Art.com, Inc., Emeryville, CA (US)

( * ) Notice: Subject to any disclaimer, the term of this patent is extended or adjusted under 35 U.S.C. 154(b) by 832 days.

(21) Appl. No.: 11/807,238

(22) Filed: May 25, 2007

Related U.S. Application Data

(60) Provisional application No. 60/808,304, filed on May 25, 2006, provisional application No. 60/823,826, filed on Aug. 29, 2006.

(51) Int. Cl.
*G09G 5/00* (2006.01)
*G09G 5/02* (2006.01)
*G06F 17/00* (2006.01)
*G06K 9/32* (2006.01)

(52) U.S. Cl. ........ 345/581; 345/657; 345/660; 345/668; 382/295; 382/298; 382/305; 715/200; 715/240; 715/246; 715/962

(58) Field of Classification Search ............... 715/200, 715/204, 210, 240–243, 246–247, 252, 273, 715/961–962; 345/581, 657, 660, 668; 382/173, 382/274, 293, 295, 298, 305
See application file for complete search history.

(56) References Cited

U.S. PATENT DOCUMENTS

| | | | | |
|---|---|---|---|---|
| 5,649,382 A | * | 7/1997 | O'Keefe | 40/790 |
| 5,870,771 A | * | 2/1999 | Oberg | 715/202 |
| 6,022,599 A | * | 2/2000 | Rietveld et al. | 428/14 |
| 6,049,783 A | | 4/2000 | Segal et al. | |
| 6,477,929 B1 | * | 11/2002 | Gibbs, Sr. | 83/13 |
| 6,633,852 B1 | | 10/2003 | Heckerman et al. | |
| 2001/0004735 A1 | | 6/2001 | Kindo et al. | |
| 2001/0033918 A1 | * | 10/2001 | Straub et al. | 428/195 |
| 2001/0034688 A1 | | 10/2001 | Annunziata | |
| 2001/0044757 A1 | | 11/2001 | Robb et al. | |
| 2002/0004764 A1 | | 1/2002 | Stolze et al. | |
| 2002/0062258 A1 | | 5/2002 | Bailey et al. | |
| 2002/0184111 A1 | | 12/2002 | Swanson | |
| 2002/0194095 A1 | | 12/2002 | Korean | |
| 2003/0023505 A1 | | 1/2003 | Eglen et al. | |
| 2003/0051255 A1 | * | 3/2003 | Bulman et al. | 725/135 |
| 2003/0103351 A1 | * | 6/2003 | Privas et al. | 362/276 |
| 2003/0149653 A1 | | 8/2003 | Penney et al. | |
| 2006/0170669 A1 | * | 8/2006 | Walker et al. | 345/418 |
| 2006/0204134 A1 | * | 9/2006 | Modrall et al. | 382/291 |
| 2007/0067179 A1 | * | 3/2007 | Kerr et al. | 705/1 |
| 2007/0088627 A1 | * | 4/2007 | Elson et al. | 705/27 |

OTHER PUBLICATIONS

Website, "Edit Artwork: Artist Portfolio—absolutearts.com", www.absolutearts.com/cgi-bin/portforlio/art/Artwork-page.cgi?login=..., copyright 1995-2003, World Wide Arts Resources Corp., 1 page.

Website, "Artist Portfolio at absolutearts.com", www/absolutearts/com/portfolios/s/..., copyright 1995-2003, World Wide Arts Resources Corp., 2 pages.

(Continued)

*Primary Examiner* — Wesner Sajous
(74) *Attorney, Agent, or Firm* — Weaver Austin Villeneuve & Sampson LLP

(57) ABSTRACT

In one embodiment, a method of displaying a representation of a frame includes identifying a molding type capable of being used in a frame. A set of digital images is obtained, wherein each one of the set of digital images represents molding of the molding type in a different one of a plurality of orientations. A representation of the frame is then displayed using the set of digital images.

37 Claims, 18 Drawing Sheets

OTHER PUBLICATIONS

Website, "Gallery Portfolios Alphabetized—absolutearts.com/wwar.com", http://galleries.absolutearts.com/alphabetized.html, copyright 1995-2003, World Wide Arts Resources Corp., 2 pages.

Website, Account Access Login screen, www.absolutearts.com/cgi-bin/portfolio/art/artist-sign-in-newest.cgi?login=&passwd..., copyright 1995-2003, World Wide Arts Resources Corp., 1 page.

Website, "Portfolio Manager", www/absolutearts.com/cgi-bin/portfolio/art/artist-sign-in-newest.cgi?login=..., copyright 1995-2003, World Wide Arts Resources Corp., 2 pages.

Website, "Statement: Artist Portfolio—absolutearts.com", www.absolutearts.com/cgi-bin/portfolio/art/statement-page.cgi?login=..., copyright 1995-2003, World Wide Arts Resources Corp., 1 page.

Website, "Sales Agreement: Free Artist Portfolio—absolutearts.com", www.absolutearts.com/cgi-bin/portfolio/art/sales-agreement-page/cgi?login=..., copyright 1995-2003, World Wide Arts Resources Corp., 2 pages.

Website, "Art Press Release Services—absolutearts.com", www.absolutearts.com/pressreleaseservices/, copyright 1995-2003, World Wide Arts Resources Corp., 1 page.

Website, "Zazzle.com—Buy & Sell Posters, T-Shirts, and Greeting Cards", www.zazzle.com, copyright 2000-2004, Zazzle.com, Inc. 2 page.

Website, "Zazzle.com—Posters, T-Shirts and Cards", www.zazzle.com/products/gallery/featured.asp, copyright 2000-2004, Zazzle.com, Inc., 1 page.

Website, "Zazzle.com—Posters and Prints", www.zazzle.com/products/gallery/featured_228.asp, copyright 2000-2004, Zazzle.com, Inc., 2 pages.

Website, "Zazzle.com—Fine Art, Historical Maps, & Old Photos from Museums, Libraries, & Famous Artists", www.zazzle.com/collections/gallery/featured.asp, copyright 2000-2004, Zazzle.com, Inc., 1 page.

Website, "Zazzle.com—Create Custom T-Shirts, Posters, and Cards", www.zazzle.com/create/info/introduction.asp, copyright 2000-2004, Zazzle.com, Inc., 2 pages.

Website, "Zazzle.com—Create Custom T-Shirts, Posters, and Cards", www.zazzle.com/create/info/private.asp, copyright 2000-2004, Zazzle.com Inc., 1 page.

Website, "Zazzle.com—Create Custom Posters and Prints", www.zazzle.com/crate/custom/prints.asp, copyright 2000-2004, Zazzle.com, Inc., 1 page.

Website, "Zazzle.com—Image Size Guide for Creating Custom T-Shirts, Posters, and Cards", www.zazzle.com/create/help/image_size_guide.asp, copyright 2000-2004, Zazzle.com, Inc., 2 pages.

Website, Zazzle.com Registration Page, www.zazzle.com/login/login.asp?return%5Furl=http%3A%2F%2Fwww%2Ezazzle..., copyright 2000-2004, Zazzle.com, Inc., 1 page.

Website, "Zazzle.com—Information for First Time Visitors", www.zazzle.com/welcome/intro/contribute/default/asp, copyright 2000-2004, Zazzle.com, Inc., 1 page.

Website, "Zazzle.com—Information for First Time Visitors", www.zazzle.com/welcome/intro/contribute/how.asp, copyright 2000-2004, Zazzle.com, Inc., 2 pages.

Website, "Zazzle—Create a Product > Create Posters & Prints", http://dzn.zazzle.com/isapi/design_print.dll, copyright 2000, Zazzle.com, Inc., 1 page.

Website, "Zazzle—Create a Product > Create Posters & Prints", http://dzn.zazzle.com/isapi/design_print.dll?action=page&page=size_image&design-id=5D..., copyright 2000, Zazzle.com, Inc. 1 page.

Website, "Webshots Desktop Software Download", www.webshots.com/samplers/, copyright 1995-2004, Twofold Photos, Inc., 2 pages.

Website, "Top Rated—Top Downloads Screen Saver and Wallpaper Photos by Webshots", www.webshots.com/g/tr/td-sh.html, copyright 1995-2004, Twofold Photos, Inc., 2 pages.

Website, "Webshots Gallery—Animals—Newest—Bending Over Backwards, Snowy Egret", www.webshots.com/g/25/nw-nw/47213.html, copyright 1995-2004, Twofold Photos, Inc., 2 pages.

Website, "Downloading Professional Photos from Webshots", www.webshots.com/html/photo_download_moreinfo.html, copyright 1995-2004, Twofold Photos, Inc., 1 page.

* cited by examiner

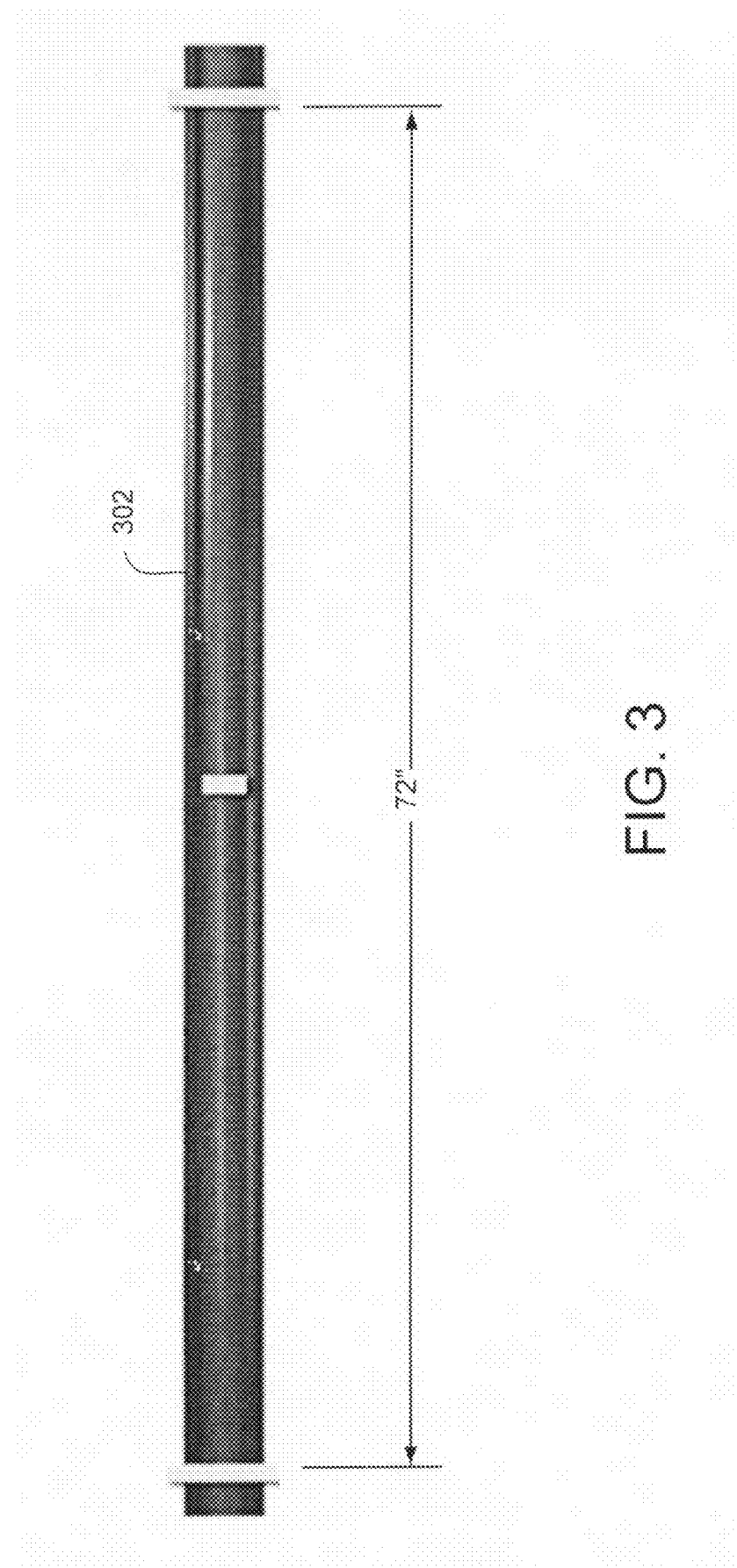

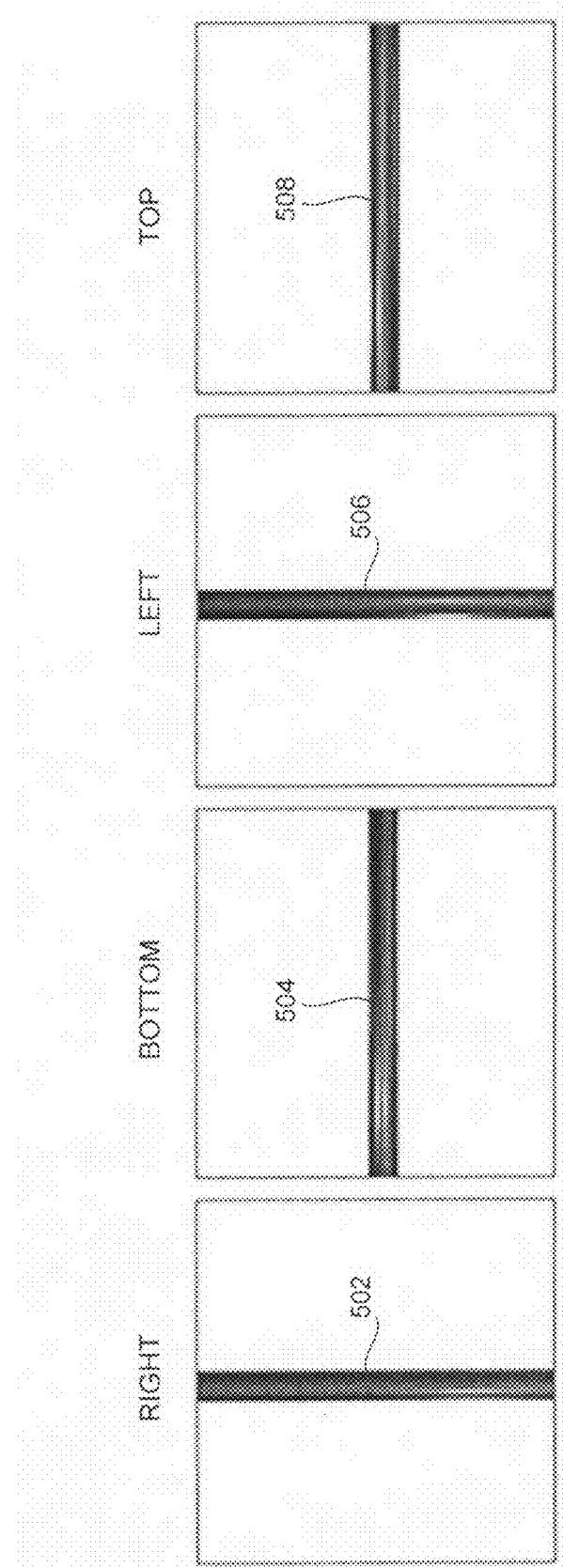

FIG. 13A

NATURAL FRAMING SYSTEM

RELATED APPLICATIONS

This application claims priority from Provisional Application Ser. No. 60/808,304, entitled "Virtual Frame Studio," by Marston et al, filed on May 25, 2006, which is incorporated herein by reference for all purposes.

This application also claims priority from Provisional Application Ser. No. 60/823,826, entitled "Virtual Frame Studio," by Marston et al, filed on Aug. 29, 2006, which is incorporated herein by reference for all purposes.

BACKGROUND

The disclosed embodiments relate to the generation of a representation of a frame for display via a computer. More particularly, the disclosed embodiments relate to a method and system for displaying an image of a frameable product via a network.

Traditionally, consumers have purchased artwork from a brick and mortar store. In recent years, various companies have enabled posters to be purchased from their websites via the Internet. Some of these websites also provide a framing service, enabling consumers to purchase a poster that is already framed.

When a user views a particular poster, the user actually views a digital image representing the poster. In addition, for those websites that provide framing options, the user may view the poster with a selected frame. Unfortunately, the image presented to the user may not be representative of certain characteristics present in the physical poster and/or frame. As a result, the user cannot view a realistic version of the product he or she will receive. Unfortunately, this may lead to consumer dissatisfaction, product returns, and losses in profits.

SUMMARY

In accordance with one embodiment of the invention, a method of displaying a representation of a frame includes identifying a molding type capable of being used in a frame. A set of digital images may be obtained, wherein each one of the set of digital images represents molding of the molding type in a different one of a plurality of orientations. A representation of the frame may then be displayed using the set of digital images.

In accordance with another embodiment of the invention, a method of displaying a representation of a framed piece of artwork includes identifying a molding type capable of being used in a frame, thereby enabling a representation of the frame to be displayed. A digital representation of the frame may be displayed using the molding type. In addition, a digital representation of a piece of artwork may be obtained. Shadowing and/or highlighting may be applied to the digital representation of the piece of artwork, enabling a more realistic appearance of the piece of artwork to be displayed. Shadowing and/or highlighting may also be applied to the frame, any mat(s) present, and/or the background area surrounding the frame, thereby providing a more accurate representation of the final framed product.

In accordance with another embodiment of the invention, the disclosed embodiments pertain to a system operable to perform and/or initiate any of the disclosed methods. The system includes one or more processors and one or more memories. At least one of the memories and processors are adapted to provide at least some of the above described method operations. In yet a further embodiment, the disclosed embodiments pertain to a computer program product for performing at least some of the disclosed methods. The computer program product may include a computer readable medium and computer program instructions stored thereon for performing at least some of the disclosed method operations.

BRIEF DESCRIPTION OF THE DRAWINGS

The accompanying drawing figures incorporated in and forming a part of this specification illustrate several embodiments of the invention, and together with the description serve to explain the principles of the invention.

FIG. 3 is a diagram illustrating an example of a stick of molding that may be photographed to generate images such as those generated in FIG. 2A.

FIGS. 5A-5D together illustrate examples of different orientations in which a molding may be photographed in an environment such as that illustrated in FIG. 4.

FIGS. 13A-B together illustrate an example of a screen shot of a web site that may be used to view and purchase framed artwork displayed in accordance with the disclosed embodiments.

DETAILED DESCRIPTION OF EXAMPLE EMBODIMENTS

Figure 1:
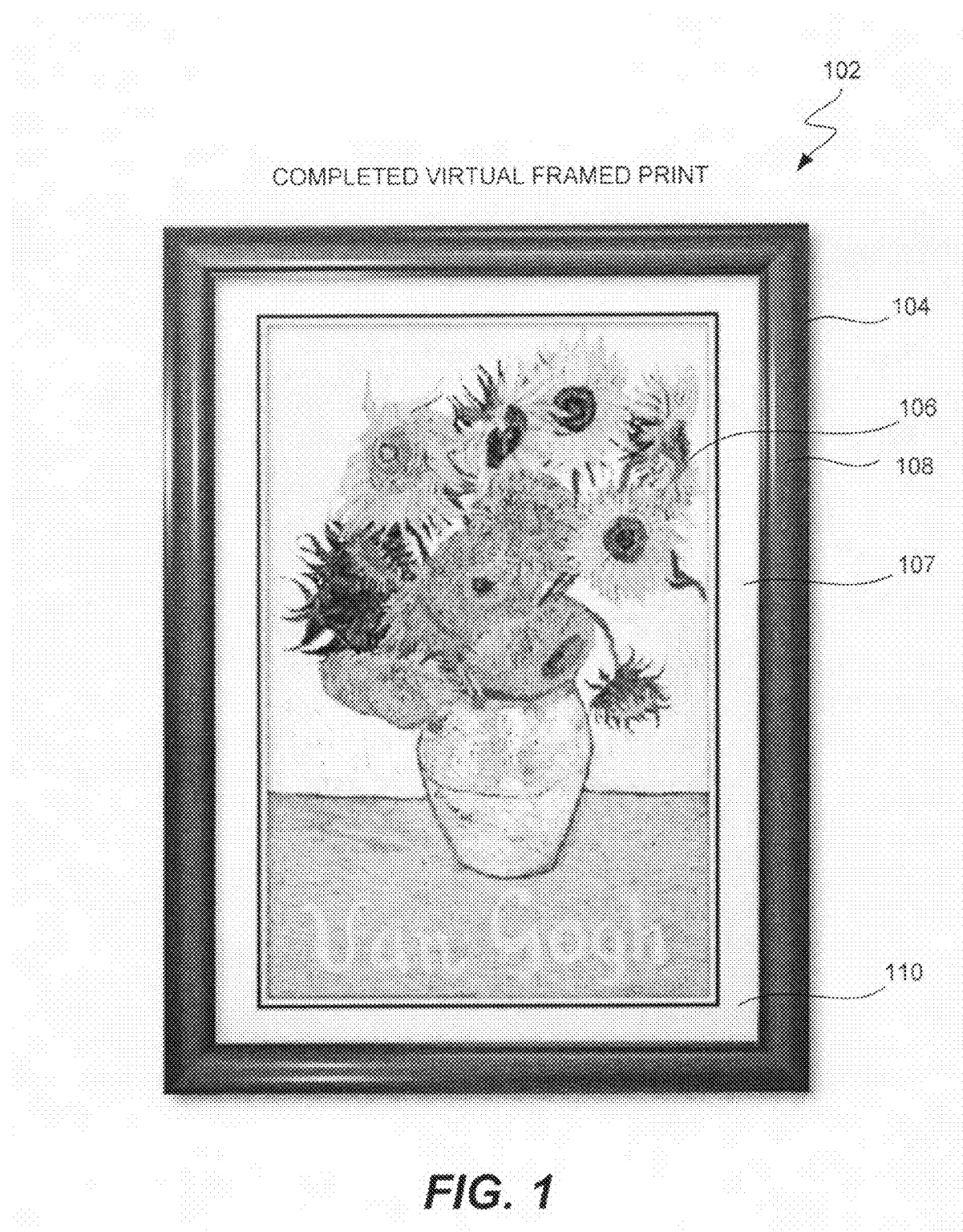
FIG. 1 is a diagram illustrating an example of an image of a framed piece of artwork that may be generated in accordance with various embodiments of the invention.

In the following description, numerous specific details are set forth in order to provide a thorough understanding of the disclosed embodiments. It will be obvious, however, to one skilled in the art, that the present invention may be practiced without some or all of these specific details. In other instances, well known process steps have not been described in detail in order not to unnecessarily obscure the disclosed embodiments.

When a framed piece of artwork is displayed on a wall, the appearance of the framed piece of artwork can be very different from an image such as a digital image representing the framed piece of artwork that is presented to a user. For example, the image representing the framed piece of artwork that is presented via a web site typically lacks the shadowing and highlighting effects that are often present in the physical framed piece of artwork. As a result, the framed piece of artwork often appears to the user to be "flat." As another example, many websites display frames by duplicating a "tile" representing a small segment of a molding. Accordingly, the image presented to the user is typically far different from the physical framed product that the user will receive.

The disclosed embodiments enable a representation of a frame or a framed piece of artwork to be presented to a user in a more realistic manner. As a result, the user may view a more accurate representation of a framed piece of artwork before they make a final purchase decision. Accordingly, the user is more likely to make choices that are to their satisfaction.

In one embodiment, a virtual frame studio allows users to select and customize framing and related items (e.g., matting) for artwork, photographs, posters and other frameable products for viewing and purchase. This is accomplished by simulating the appearance of the poster or artwork with framing options selected by the user as their framing choices are made. This allows the user to instantly receive feedback as to the appearance of their framing choices placed on artwork that the user has selected to assist the user in their decision-making process. Thus, the virtual frame studio provides a more satisfying purchasing experience.

In addition to allowing the user to select custom frame options, the virtual frame studio may provide other features and options to assist the user in the framing selection and purchase process. For instance, the virtual frame studio may allow other selections related to framing to be made, such as matting colors and width. Custom pricing may also be presented to the user as each selection is made so that the user is aware of the price that will be charged to order the poster or artwork as framed according to the user's selections.

In one embodiment, a default frame and/or matting configuration may be stored for each poster or artwork that can be framed. The default frame may merely serve as a starting point. However, the default framing configuration may be carefully selected to be compatible with the corresponding poster or artwork.

In one embodiment, the virtual frame studio is designed to be offered by an online retailer of posters, photographs, or other artwork. One example of such a retailer is the assignee of the present invention, Art.com. The online retailer may host an online retail store where a large number of posters and artwork are available for sale. The user may search or review the posters and artwork and make a desired selection for purchase. In order to realize profits from framing services and as an added convenience to the user, the online retailer may provide for the ability of the user to also purchase the poster or artwork as framed.

In the following description, the term "print" is used to describe various examples and embodiments of the invention. However, it is important to note that these examples are merely illustrative. Therefore, the disclosed embodiments may performed with other types of artwork. In other words, a piece of artwork may include any number or combinations of media types. For instance, the piece of artwork may include at least one of a photograph, painting, poster, print, drawing, or sketch. Thus, a single digital image need not represent a single media type. Rather, a single digital image may represent a variety of combinations of media types.

FIG. 1 is a diagram illustrating an example of a virtual framed piece of artwork that may be generated in accordance with various embodiments of the invention. As shown in FIG. 1, a virtual framed print 102 may be generated in accordance with various embodiments of the invention. In this example, the virtual framed print 102 includes a frame 104, a print 106, and a mat 107. Of course, it is important to note that a framed print need not include a mat. The representation of the frame may include highlights such as that shown at 108, as well as shadowing (not shown). Similarly, the representation of the print and/or mat may include shadowing effects and/or highlighting effects. In this example, minimal shadowing of the mat is shown at 110. Accordingly, various effects such as shadowing and/or highlighting may be represented in the frame 104, print 106, and/or mat.

In order to more accurately represent a frame that includes highlighting and/or shadowing effects, the frame may be depicted using one or more images of a physical "stick" of a particular molding. The molding may be a default selection, or may be selected by a user. In addition, the appearance of a print to be framed may be simulated via a digital image. Thus, a representation of a frame or framed piece of artwork may be generated using one or more digital images. In this manner, a user may view a "virtual frame" or "virtual framed piece of artwork."

Figure 2A:
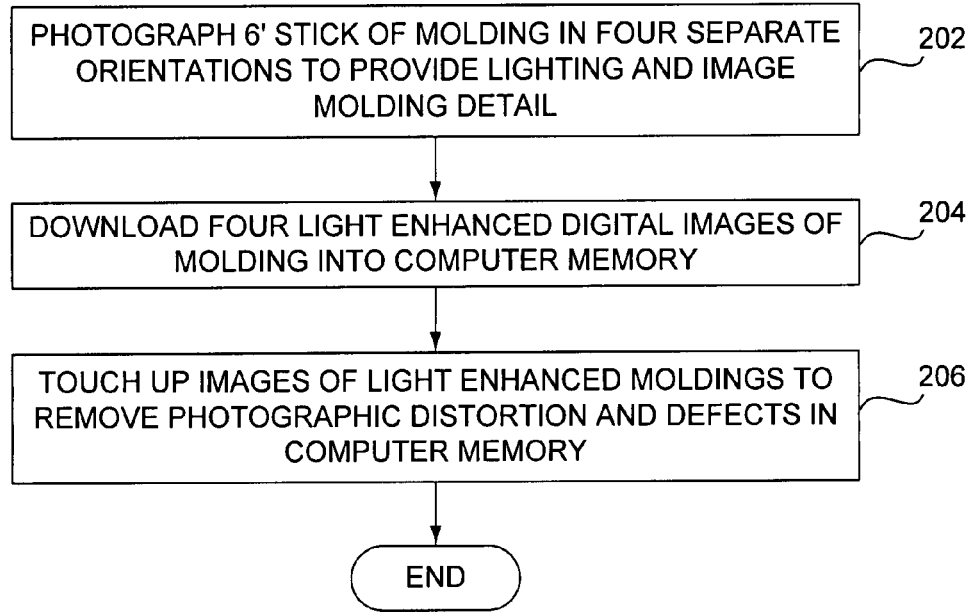
FIG. 2A is a process flow diagram illustrating an example method of generating images that may be used to display a frame including a particular molding.

FIG. 2A is a process flow diagram illustrating an example method of generating images that may be used to display a frame including a particular molding. Each stick of molding may be photographed in one or more orientations. As shown in FIG. 2A, in accordance with one embodiment, a stick of molding may be photographed in four separate orientations at 202 to provide more realistic lighting and/or molding detail. The same lighting conditions may be provided in order to photograph each of the four separate orientations. These four separate orientations may be used to represent the top, bottom, left, and right portions of a frame. The stick of molding that is photographed may be a particular length, such as 6 feet. More particularly, the stick of molding that is photographed may be of sufficient length to enable a resulting image to be cropped and/or resized to the desired length.

Once the stick of molding is photographed in the four separate orientations, the four digital images of the molding may be downloaded into a computer memory at 204. These digital images may be referred to as "light enhanced," since they include lighting effects resulting from the lighting present during the photographing of the molding in the four different orientations. It may also be desirable to "touch up" one or more of the images of the light enhanced moldings to remove any photographic distortion or defects at 206. Thus, the set of digital images may be modified after the images are generated. The process may end at 208.

Figure 2B:
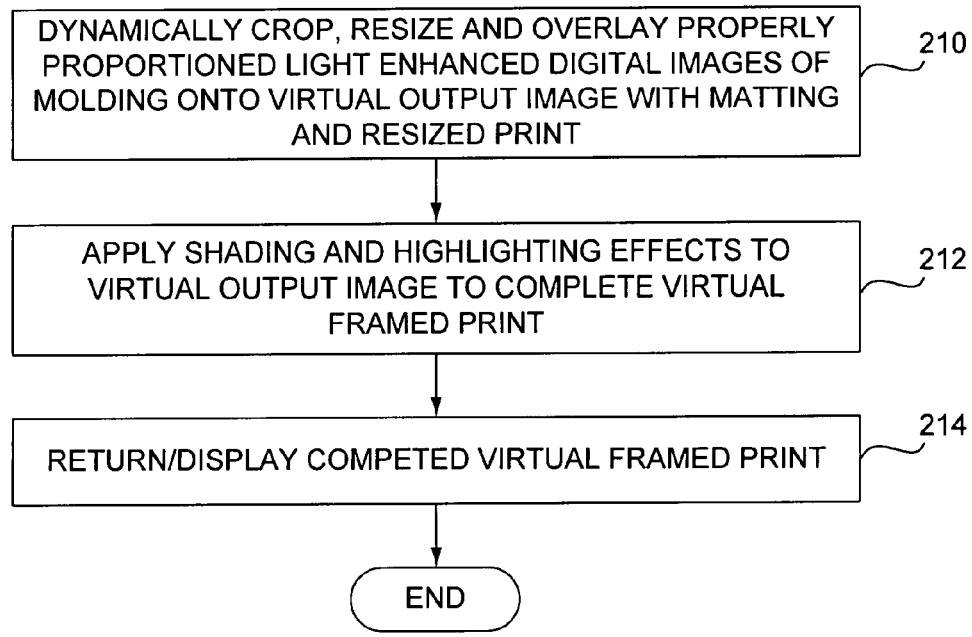
FIG. 2B is a process flow diagram illustrating an example method of displaying a framed piece of artwork using images such as those generated in FIG. 2A.

FIG. 2B is a process flow diagram illustrating an example method of displaying a framed piece of artwork using the images generated in FIG. 2A. In order to display a framed print, the width and height of the frame may be determined based upon the dimensions of the print, the width of the molding and the revealed width of any mat(s) that are included. Using these measurements, the light enhanced digital images of the molding may be cropped and/or resized at 210 to obtain properly proportioned light enhanced moldings, which may be "overlayed" onto a virtual output image including a print and any mat(s) that are included. As with the molding, the image of the print may also be resized. It may also be desirable to apply shading and/or highlighting effects to the virtual output image in order to complete the virtual framed print at 212. More particularly, shading and/or highlighting effects may be provided to represent shadows and/or lighting effects on the print, the mat(s), the frame, and/or the area outside the framed print. Such shadows and/or lighting effects may simulate shadows or highlighting resulting from the frame and/or any mat(s) that are included. The resulting virtual output image representing the virtual framed print may be displayed at 214. The process may end at 216.

FIG. 3 is a diagram illustrating an example of a stick of molding 302 that may be photographed. In this example, the stick of molding 302 is 72 inches long. Thus, the stick of molding may be photographed over substantially the entire length of the piece of molding. The ratio of width to height of a stick of molding may be at least approximately 3. Stated another way, the molding and therefore the corresponding photograph may have an aspect ratio of at least about 3. In this manner, the stick of molding may be of sufficient length to capture any shadow and/or highlighting effects upon being photographed. A different stick of molding may be photographed for each type of molding that may be used in a frame. For instance, a type of molding may be defined by a particular width, pattern, color, texture, finish, and/or material (e.g., wood or metal).

Figure 4:
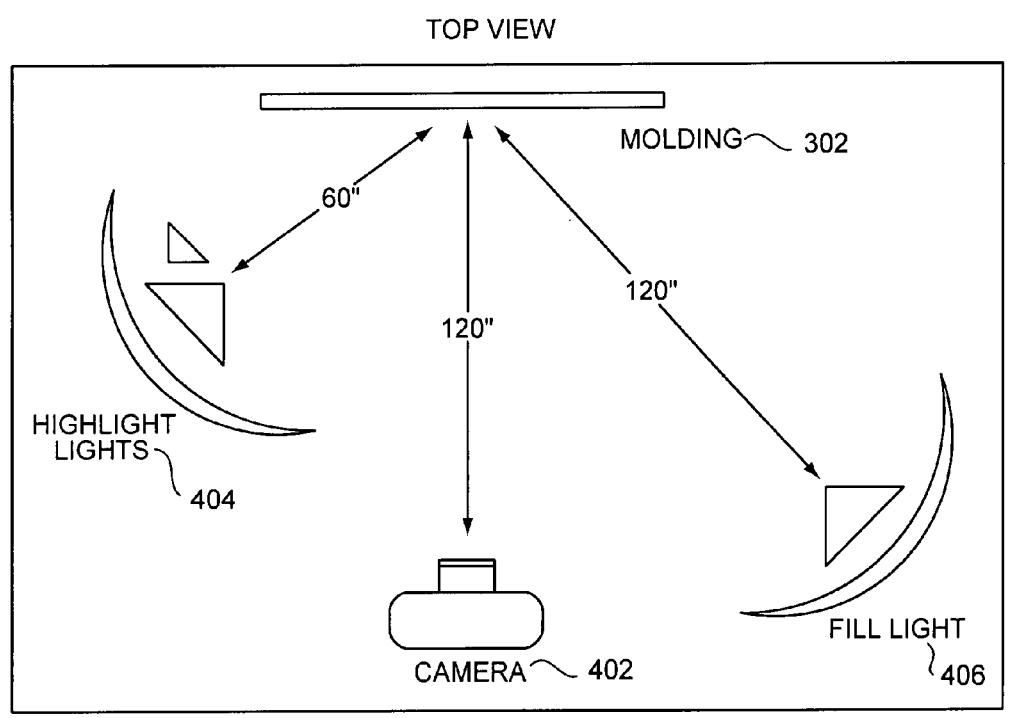
FIG. 4 is a diagram illustrating a top view of an example environment hi which a molding such as that shown in FIG. 3 may be photographed.

Each stick of molding may be photographed under various lighting conditions. FIG. 4 is a diagram illustrating a top view of an example environment in which a molding such as that shown in FIG. 3 may be photographed. In order to photograph the stick of molding 302, a camera 402 such as a digital camera may be used. In this example, the camera is placed approximately 120 inches from the molding at an approximately 90 degree angle from the molding. In addition, highlight lights 404 may be used to generate highlight effects. In this example, the highlight lights 404 are placed approximately 60 inches from the stick of molding 302 at an angle less than 90 degrees from the stick of molding 302. Fill light 406 may also be provided. In this example, the fill light 406 is placed approximately 120 inches from the molding at less than a 90 degree angle from the molding 302. As shown in this example, the highlight lights 404 and the fill light 406 are placed at opposite sides of the camera.

FIGS. 5A-5D together illustrate examples of different orientations in which a stick of molding may be photographed in an environment such as that illustrated in FIG. 4. In one embodiment, the stick of molding is photographed in four different orientations to depict the four different sides of a frame. The purpose of photographing four different orientations of the same stick of molding is to accurately show how real world light will produce highlights and/or shadows on the molding pattern. FIG. 5A illustrates an orientation of a stick of molding 502 that may be used as the right side of a frame, FIG. 5B illustrates an orientation of a stick of molding 504 that may be used as the bottom of a frame, FIG. 5C illustrates an orientation of a stick of molding 506 that may be used as the left side of a frame, and FIG. 5D illustrates an orientation of a stick of molding 508 that may be used as the top of a frame. However, it is also possible to photograph a stick of molding in one orientation and rotate the stick digitally three additional times to produce four different orientations. However, the lighting and shadows will not consequentially result in an accurate reflection of a real world representation.

Figure 6A:
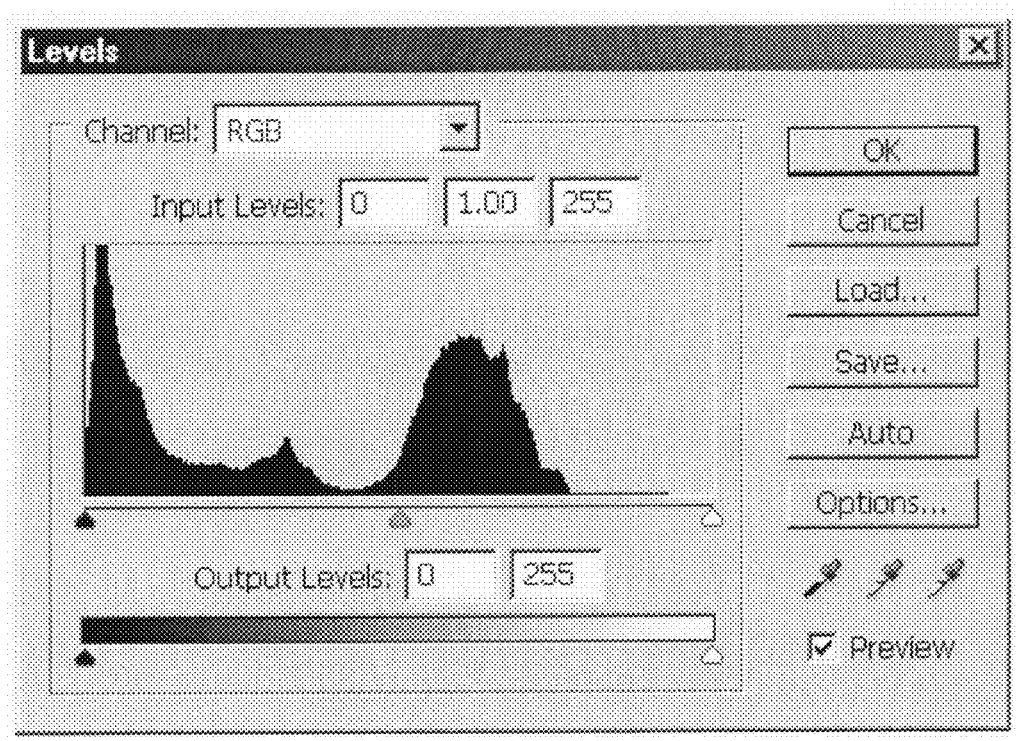
FIGS. 6A-6B together illustrate examples of mechanisms that may be used to modify photographs such as those generated in FIGS. 5A-5D.
Figure 6B:
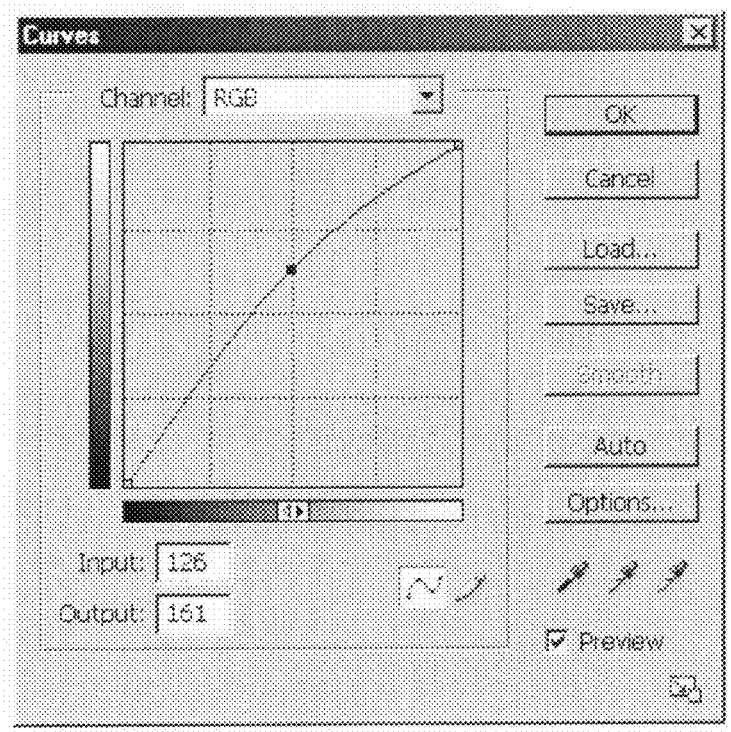

FIGS. 6A-6B together illustrate examples of mechanisms that may be used to modify photographs such as those generated in FIGS. 5A-5D. More particularly, FIG. 6A is an example user interface to a standard computer program that may be used to modify intensity levels of the photograph being modified. Similarly, FIG. 6B is an example user interface to a standard computer program that may be used to modify color levels represented in the photograph being modified. For instance, the interface may be used to indicate a level of red, green, and/or blue to be used to represent the photograph being modified.

Figure 7:
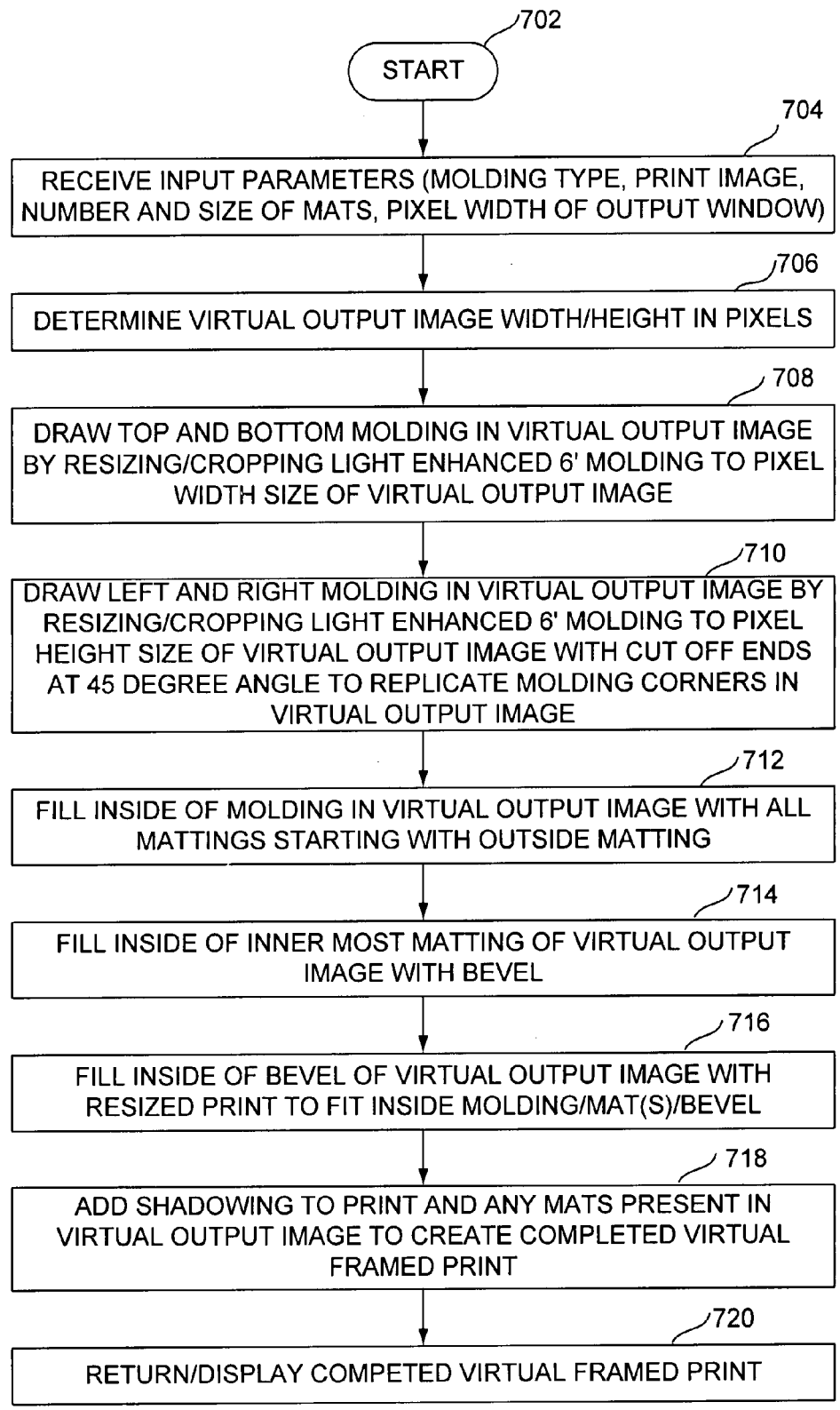
FIG. 7 is a process flow diagram illustrating an example detailed method of displaying an image of a framed piece of artwork.

FIG. 7 is a process flow diagram illustrating an example detailed method of displaying a framed piece of artwork. The method begins at 702. Various parameters may be obtained or received at 704. For instance, the parameters may include a frame type (e.g., molding type), an identification of a print image and associated information, the size (e.g., width) of each mat, the color of each mat, and/or the total width (e.g., pixel width) of the output window. One or more of these parameters may be obtained, at least in part, via one or more user selections. It is also possible that one or more of these parameters may be obtained, at least in part, via default configurations or other data that may be retrieved or calculated.

The molding type may be used to identify the corresponding images of the molding. For instance, each molding type may have a set of images associated therewith. Moreover, the molding type may based upon one or more parameters, such as the width of the molding, the material in which the molding is manufactured (e.g., wood or metal), a finish (e.g., shiny or matt), a pattern or engraving in the molding, a texture of the molding, the amount that the molding is raised, and/or the color of the molding. The amount that the molding is raised and/or the width of the molding may be used, for example, to ascertain an amount of shadowing to apply to the mat(s), the print image, and/or the background surrounding the framed print. The molding type may be ascertained from a default setting or via one or more user selections.

The representative digital print image may be identified via a user selection of a print. For instance, a user may click on a particular print or may select a print from a menu. Alternatively, the print image may be configured as a default print image.

The dimensions of the physical print and/or digital print image may be obtained from data stored in association with the print image. The dimensions of the digital print image may include the height and width of the digital image (e.g., in pixels). Similarly, the dimensions of the physical print may include the height and width of the actual physical print (e.g., in inches or centimeters). It is important to note that the height and width of the actual physical print may be "trimmed." More particularly, a user may request that the top, bottom, left, and/or right borders of the print be "trimmed" in accordance with one or more trimming parameters. A border may be defined as a strip forming the outer edge of each of the sides of the print. The trimming parameters may indicate an amount of the border to be trimmed or an amount of the border that is to remain. Accordingly, the size of the print to be framed may not be the height and width of the actual physical print as specified in the obtained data.

A framed print may include zero or more mats. More particularly, one or more mats may be established via a default setting, or via one or more user selections. More particularly, each mat may have an associated color and size.

The size of a mat may include a revealed width of the mat. The revealed width is the width of the mat that is revealed and therefore visible to a viewer, rather than the total width of the mat. The revealed width associated with the top and bottom sides of the mat may be the same as the revealed width associated with the left and right sides of the mat. Alternatively, the revealed width associated with the top and bottom sides of the mat may be different from the revealed width associated with the left and right sides of the mat. The size of the mat may also include a depth of the mat. The depth of the mat may be used to ascertain an amount of shadowing to apply to the print image, for example. Moreover, the size of the mat may also include a bevel width of the mat, which may alternatively be represented as an angle associated with the inner sides of the mat.

The total width of the output window may be ascertained from the width of a window such as a user selected window. The width of the virtual output image may be represented in pixels or another form of measurement (e.g., inches). The number of pixels in the width of the output window may be calculated by ascertaining a width (e.g., in inches) of the output window and ascertaining the number of pixels in the width of the output window using a particular number of pixels per inch that may be displayed via the screen. For instance, the resolution of a display may be configured or obtained.

The height and width of the virtual output image (e.g., in pixels) may be determined at 706. More particularly, the width of the output window may be used to determine the width (or the maximum width) of the virtual output image. The width and height of the virtual output image may be represented in inches and/or pixels. This may be accomplished by determining the width and height of each segment of the virtual output image. For instance, the measurements (and therefore the desired locations) of each segment of the frame, mat(s), and print may be ascertained.

In order to display the frame portion of the virtual output image, the four sides of the molding may be displayed. This may be accomplished by obtaining a set of digital images corresponding to the desired molding type. More particularly, the representation of the molding in one or more of the set of digital images may be cropped and/or resized. In one embodiment, at least a segment of the image of the molding in each of four different digital images associated with four different orientations may be obtained.

In this example, the top and bottom portions of the molding in the virtual output image may be drawn or otherwise generated at 708. This may be accomplished by cropping and/or resizing a corresponding image of a light enhanced stick of molding to a width (e.g., number of pixels) of the virtual output image. Similarly, the left and right portions of the molding in the virtual output image may be drawn at 710. This may be accomplished by cropping and/or resizing a corresponding image of a light enhanced stick of molding to a height (e.g., number of pixels) of the virtual output image.

In order to replicate the corners of a frame, the segment of the representation of the molding in at least two of the four digital images may be cropped. More particularly, at least one end of the segment of the representation of the molding in at least two of the four digital images may be cropped such that the cropped end is cut off at a 45 degree angle. As one example, both ends of the segment of the representation of the molding may be cropped in at least two of the four digital images such that both ends are cut off at a 45 degree angle. In this example, the ends of the left and right portions of the molding are cut off at a 45 degree angle. By drawing the left and right portions after the top and bottom portions, the left and right portions may be overlayed over the top and bottom portions. As a result, the cut off ends of the left and right portions may delineate the corners of the frame. The portions of the representation of the molding that are "cut off" will be "transparent," and may therefore reveal the representation of the side of the molding adjoining the cropped end. Accordingly, the representation of the side of molding adjoining the cropped end need not also be cropped.

Each mat (if present) may be drawn or otherwise generated in the area defined by the molding. More particularly, a mat may be drawn in a color selected by a user. If multiple mats have been selected, the mats may be drawn and filled in any order. In this example, the mats are drawn starting with the outside mat at 712. In this manner, one or more mats may be displayed within the area defined by the frame.

The innermost mat occasionally has what is referred to as a "bevel," which is a thin strip that is exposed at each of the inner edges of the mat. Thus, the bevel on the inside of the inner most mat of the virtual output image may be drawn at 714.

In addition, the image of the selected print may be resized to fit within the area of the virtual output image defined by the molding (and any mat(s) and associated bevel) at 716. In this manner, the representation of the print may be displayed within an area defined by the molding (and/or one or more mats).

Shadowing (or highlighting) may also be added to the print, the mat(s), the frame, and/or the area outside the framed print in the virtual output image at 718. More particularly, shadowing and/or highlighting may be applied to the representation of the selected print (e.g., before or after resizing) in the virtual output image such that a modified representation of the print is displayed within an area defined by the frame. The shadowing/highlighting present in the print may represent shadowing or highlighting due at least in part to the frame and/or to any mat(s) that are represented. Similarly, shadowing and/or highlighting may be applied to a representation of a mat in the virtual output image, wherein the shadowing/highlighting may represent shadowing or highlighting due at least in part to the frame and/or any other mat(s) that are represented. More particularly, shadowing may be applied to the interior left-hand (or right-hand) side of the mat (e.g., the innermost mat).

Shadowing (or highlighting) effects may be determined or calculated based upon parameters such as the depth, bevel width, and/or color of each mat, as well as the depth, width, and/or color of the molding. In order to generate shadow effects, a shadow intensity may be applied. For instance, the shadow intensity may be a number between 0 and 10. The shadow intensity may indicate an angle from which the light is directed. The parameters(s) associated with the molding and/or mat(s) may also be applied to determine the shadow intensity. For instance, the number identifying the shadow intensity may be incremented or decremented accordingly, or multiplied by a factor to take these parameter(s) into consideration. The completed virtual framed print may be displayed at 720.

Figure 8A:
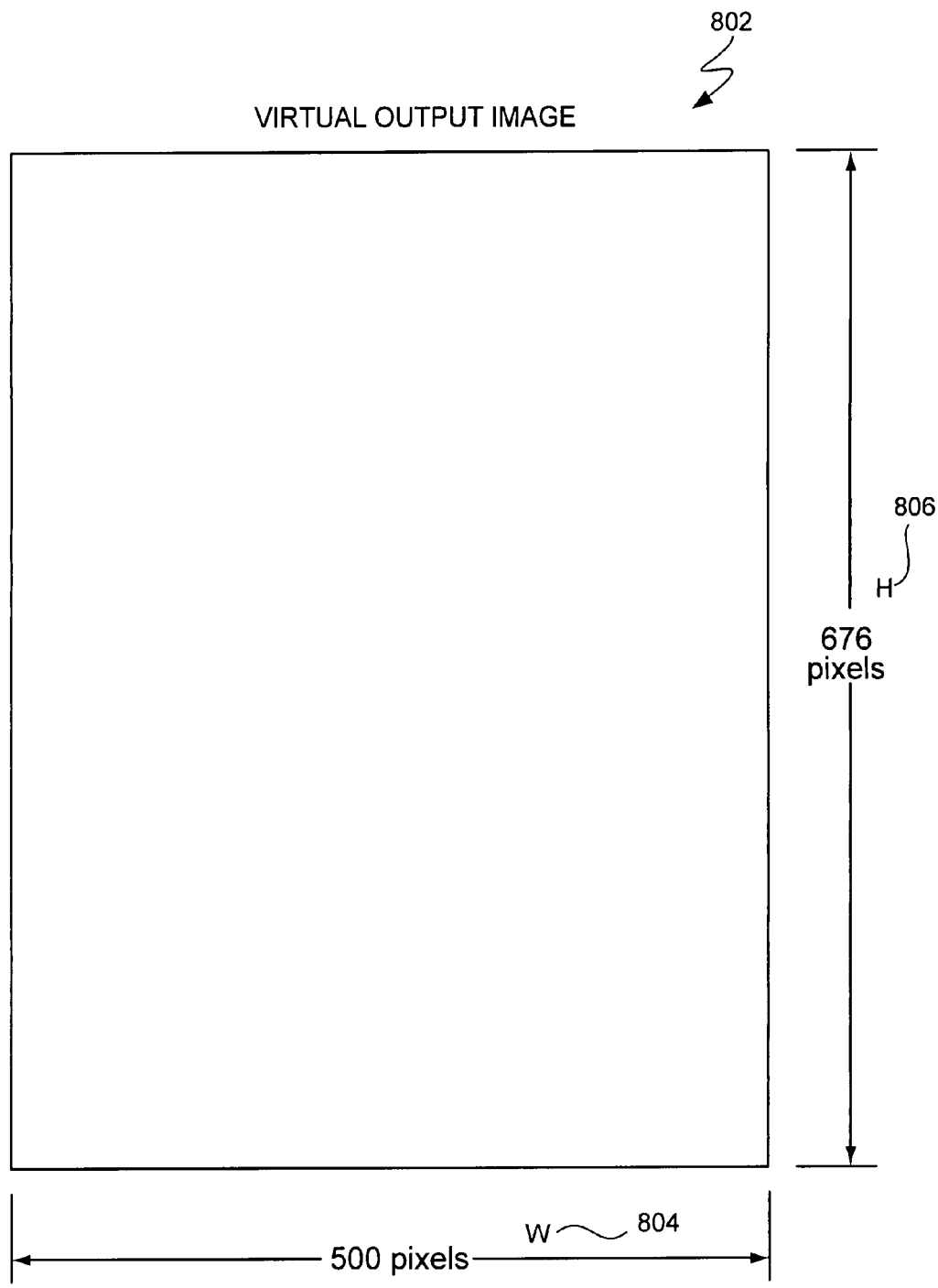
FIG. 8A is a diagram illustrating an example of the size of an output image that may be generated using a selected print.

FIG. 8A is a diagram illustrating an example of the size of an output image that may be generated using a selected print. Output image 802 is represented by width (W) 804 and height (H) 806. In order to display an image of the print, the physical print size may be obtained. In this example, the physical print size 24 inches (W)×136 inches (H). Similarly, the size of the corresponding digital source image may be obtained from data stored in association with the selected print image. The size of the digital source image may be referred to as a virtual print size. In this example, the virtual print size is 1200 pixels (W)×1800 pixels (H). From the physical and virtual measurements of the print size, it is possible to calculate the number of pixels in the digital source image that are used to represent an inch of the physical print. More particularly, in this example, the number of pixels used to represent an inch of the physical print is 50 pixels.

In order to display a virtual output image representing a framed print, it may be desirable to ascertain a size of an output "window" in which the virtual framed print is to be displayed. The size of the output window may include a width and/or height of the output window. Thus, the output window may serve as the size or a maximum size of the virtual output image that may be displayed. For instance, a width of the virtual output image in this example is 500 pixels. More particularly, the width of the output window may be 10 inches, where each inch may be used to represent 50 pixels. The output window may be automatically presented, or may be selected by a user.

In order to ascertain a size of the resulting output image including the frame and any mat(s), the width of the molding and mat(s) may be identified. In this example, the molding width is 2.5 inches. In addition, the revealed width of the selected mat in this example is 2.5 inches. Thus, the total width of the physical framed print in this example is (2.5×2)+(2.5×2)+24=34 inches. Similarly, the total height of the physical framed print in this example is (2.5×2)+(2.5×2)+36=46 inches.

As set forth above, in this example, the height of the virtual output image is 500 pixels. Using the measurements of the physical framed print, the height of the virtual output image may be determined. In this example, the height of the virtual output image is (46 inches×500 pixels)/34 inches=676 pixels.

Figure 8B:
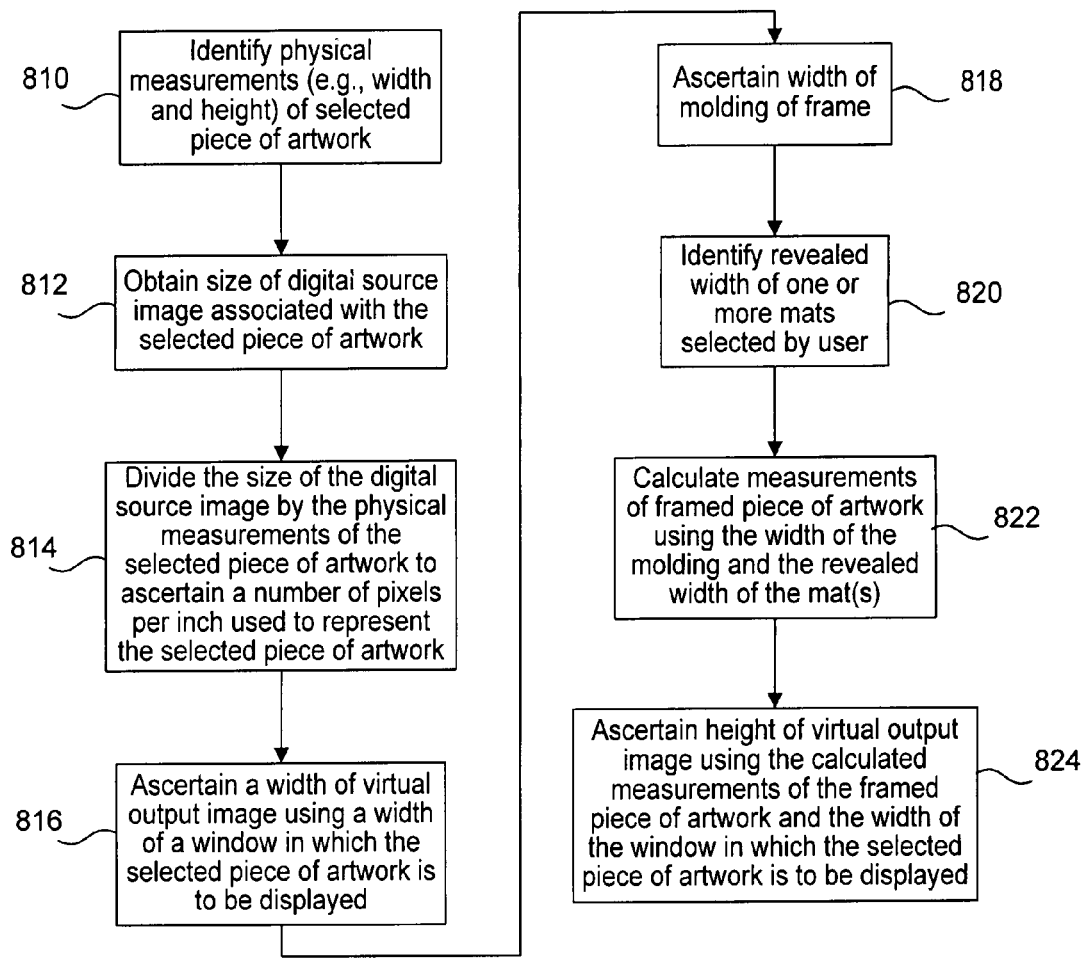
FIG. 8B is a process flow diagram illustrating an example method of determining an image height associated with an output image to be displayed.

FIG. 8B is a process flow diagram illustrating an example method of determining an image height associated with an output image to be displayed. The physical measurements (e.g., width and height) of a selected piece of artwork may be identified at 810. A size of a digital source image associated with the selected piece of artwork may be identified at 812. The size of the digital source image may be divided by the physical measurements of the selected piece of artwork to ascertain a number of pixels per inch used to represent the selected piece of artwork at 814. A width of the virtual output image may be ascertained using a width of a window in which the selected piece of artwork is to be displayed at 816.

The total width of a physical framed piece of artwork may be calculated based upon the width of the molding of the frame, the artwork being displayed, and the revealed width of each mat. Thus, a width of a molding of frame may be ascertained at 818. In addition, a revealed width of one or more mats that have been selected by a user may be identified at 820. Measurements of the resulting framed piece of artwork may be calculated at 822 using the width of the molding and the revealed width of the optional mat(s). A height of the virtual output image may be ascertained using the calculated measurements of the framed piece of artwork and the width of the window in which the virtual framed piece of artwork is to be displayed at 824.

Figure 9A:
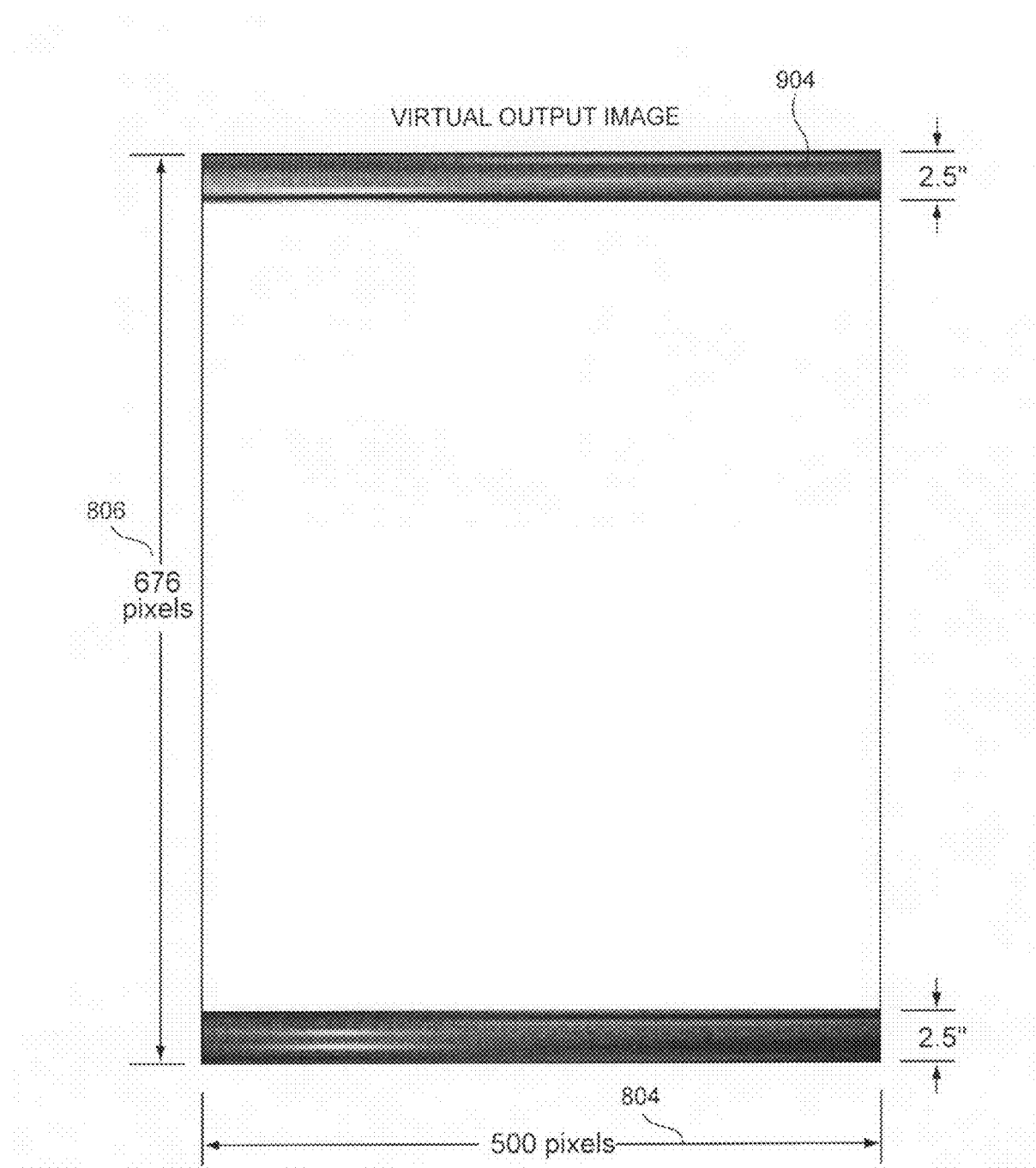
FIG. 9A is a diagram illustrating an example of cropped molding that may be displayed as top and bottom portions of a frame.

FIG. 9A is a diagram illustrating an example of cropped molding that may be displayed as top and bottom portions of a frame. Top molding 904 and bottom molding 906 may be cropped and/or resized according to the size of the virtual output image, as set forth above. More particularly, the length of the top molding 904 and the bottom molding 904 may be cropped and/or resized to the width of the virtual output image, as shown. In one embodiment, the stick of molding that has been photographed for use as the top molding and the stick of molding that has been photographed for use as the bottom molding is 6 feet, or 72 inches. The digital image associated with each of these photographs is 4800 pixels in this example. Using the size of the digital image, the width of the physical framed print, and the length of the molding that has been photographed, the length to which the top and bottom molding may be cropped may be ascertained. In this example, the length of the top and bottom molding is 4800 pixels×(34 inches/72 inches)=2267 pixels. However, as set forth above, the total width of the virtual output image is 500 pixels. Therefore, the digital image of the top and bottom molding may be cropped and/or resized to 500 pixels, as shown. The cropping and/or resizing may be accomplished using a standard program that may be used to scale an image down such as Imagemagick. As a result of the cropping and/or resizing to the 500 pixels size, the width of the molding may be resized to 14.7 pixels. More particularly, the width of the top and bottom molding may be resized using the height of the virtual output image and the height of the physical framed print. In this example, the 2.5 inch width is equivalent to the height of the virtual output image divided by the height of the physical framed print, 676 pixels per inch/46 inches=14.7 pixels.

Figure 9B:
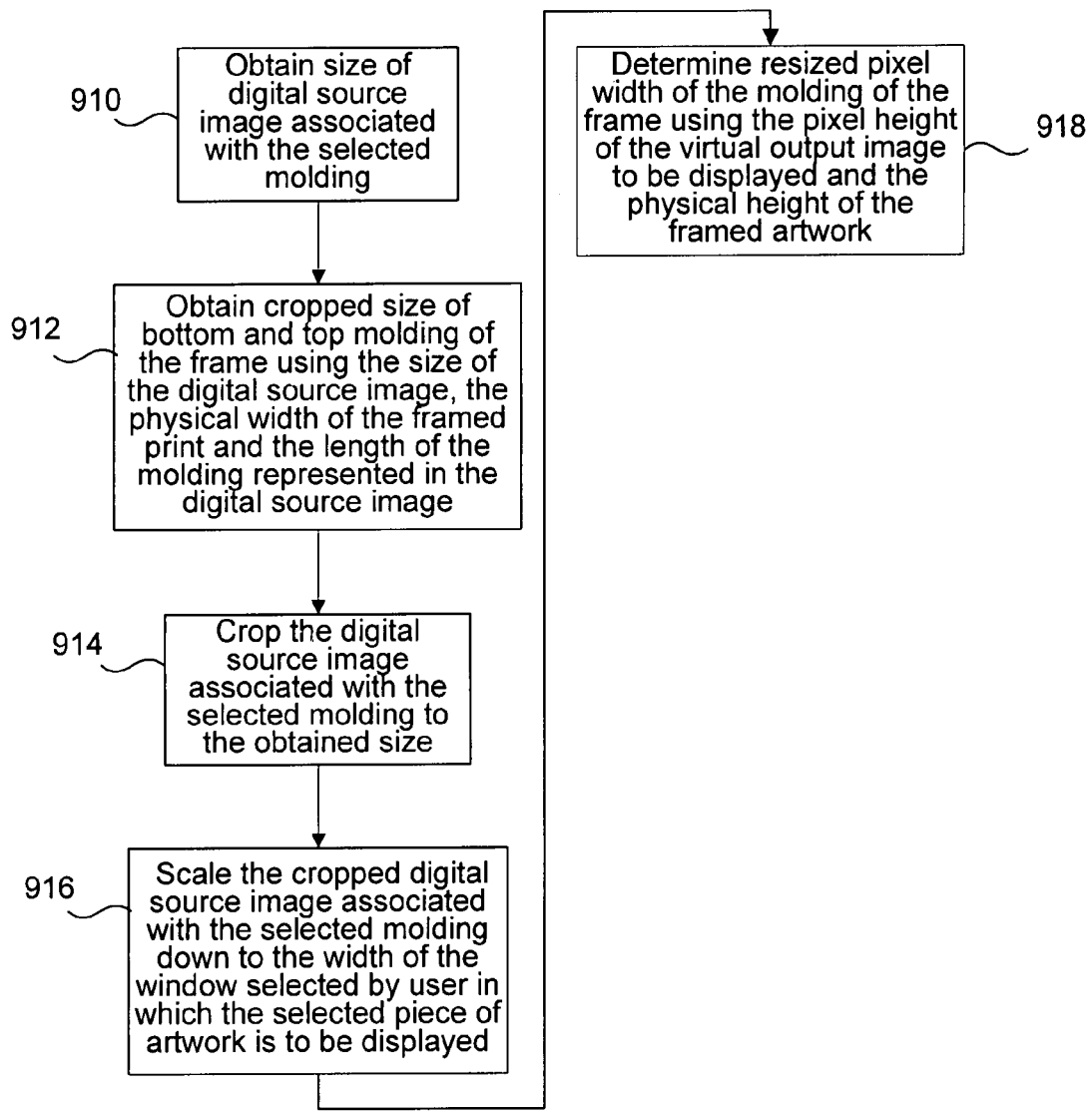
FIG. 9B is a process flow diagram illustrating an example method of determining a molding length to be displayed as the top and bottom molding of a frame.

FIG. 9B is a process flow diagram illustrating an example method of determining a molding length to be displayed as the top and bottom molding of a frame. The size of the digital source image associated with the selected molding (e.g., top or bottom molding) may be obtained at 910. The cropped size of the bottom and top molding of the frame may be obtained at 912 using the size of the digital source image, the physical width of the framed print and the length of the molding represented in the digital source image. The digital source image associated with the selected molding may be cropped to the obtained size at 914. The cropped digital source image associated with the selected molding may also be scaled down to the width of the virtual output image at 916, as appropriate. The resized pixel width of the molding of the frame may be determined using the pixel height of the virtual output image to be displayed and the physical height of the framed artwork at 918.

Figure 10A:
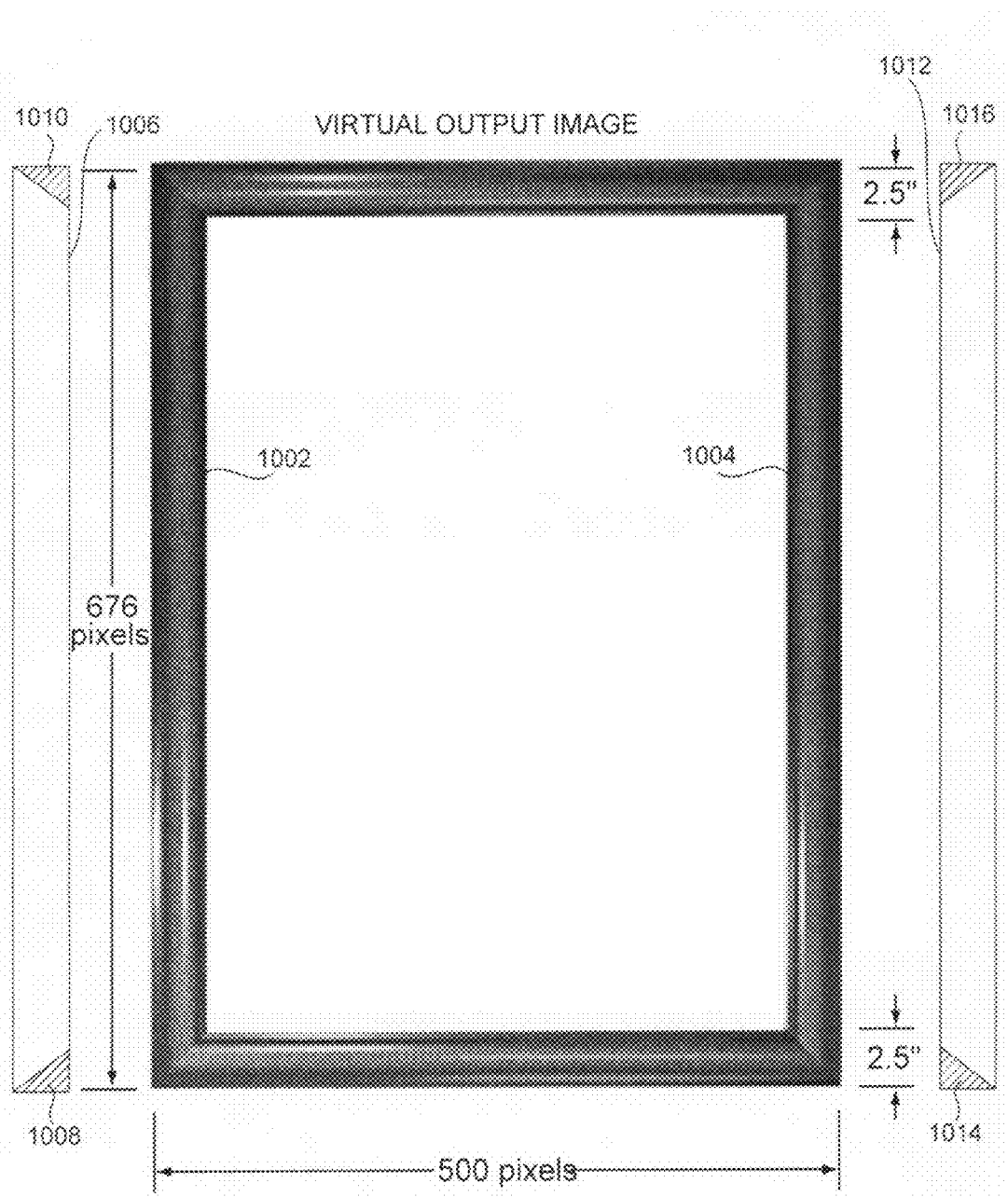
FIG. 10A is a diagram illustrating an example of cropped molding that may be displayed as left and right portions of a frame.

FIG. 10A is a diagram illustrating an example of cropped molding that may be displayed as left and right portions of a frame. Left molding 1002 and right molding 1004 may be cropped and/or resized according to the size of the virtual output image, as set forth above. More particularly, the length of the left molding 1002 and the bottom molding 1004 may be cropped and/or resized to the height of the virtual output image, as shown. In one embodiment, the stick of molding that has been photographed for use as the left molding and the stick of molding that has been photographed for use as the right molding is 6 feet, or 72 inches. The digital image associated with each of these photographs is 4800 pixels in this example. Using the size of the digital image, the physical height of the framed print, and the length of the molding that has been photographed, the length to which the left and right molding may be cropped may be ascertained. In this example, the length of the left and right molding is 4800 pixels×(46 inches/72 inches)=3066.7 pixels. However, as set forth above, the total height of the virtual output image is 676 pixels. Therefore, the digital image of the left and right molding may be cropped and/or resized to 676 pixels, as shown. The cropping and/or resizing may be accomplished using a standard program that may be used to scale an image down.

As shown in this example, the left molding may be cropped and resized as shown at 1006. More particularly, the top and bottom ends of the left molding may be cropped at a 45 degree angle such that portions 1008 and 1010 are transparent, enabling the left molding 1006 to be overlayed on top of the top and bottom molding. Similarly, the right molding may be cropped and resized as shown at 1012. More particularly, the top and bottom ends of the right molding may be cropped at a 45 degree angle such that portions 1014 and 1016 are transparent, enabling the right molding 1012 to be overlayed on top of the top and bottom molding.

As a result of the cropping and/or resizing to the 676 pixels size, the width of the molding may be resized to 14.7 pixels. More particularly, the width of the left and right molding may be resized using the width of the virtual output image and the width of the physical framed print. In this example, the 2.5 inch width is equivalent to the width of the virtual output image divided by the width of the physical framed print, 500 pixels per inch/34 inches=14.7 pixels.

Figure 10B:
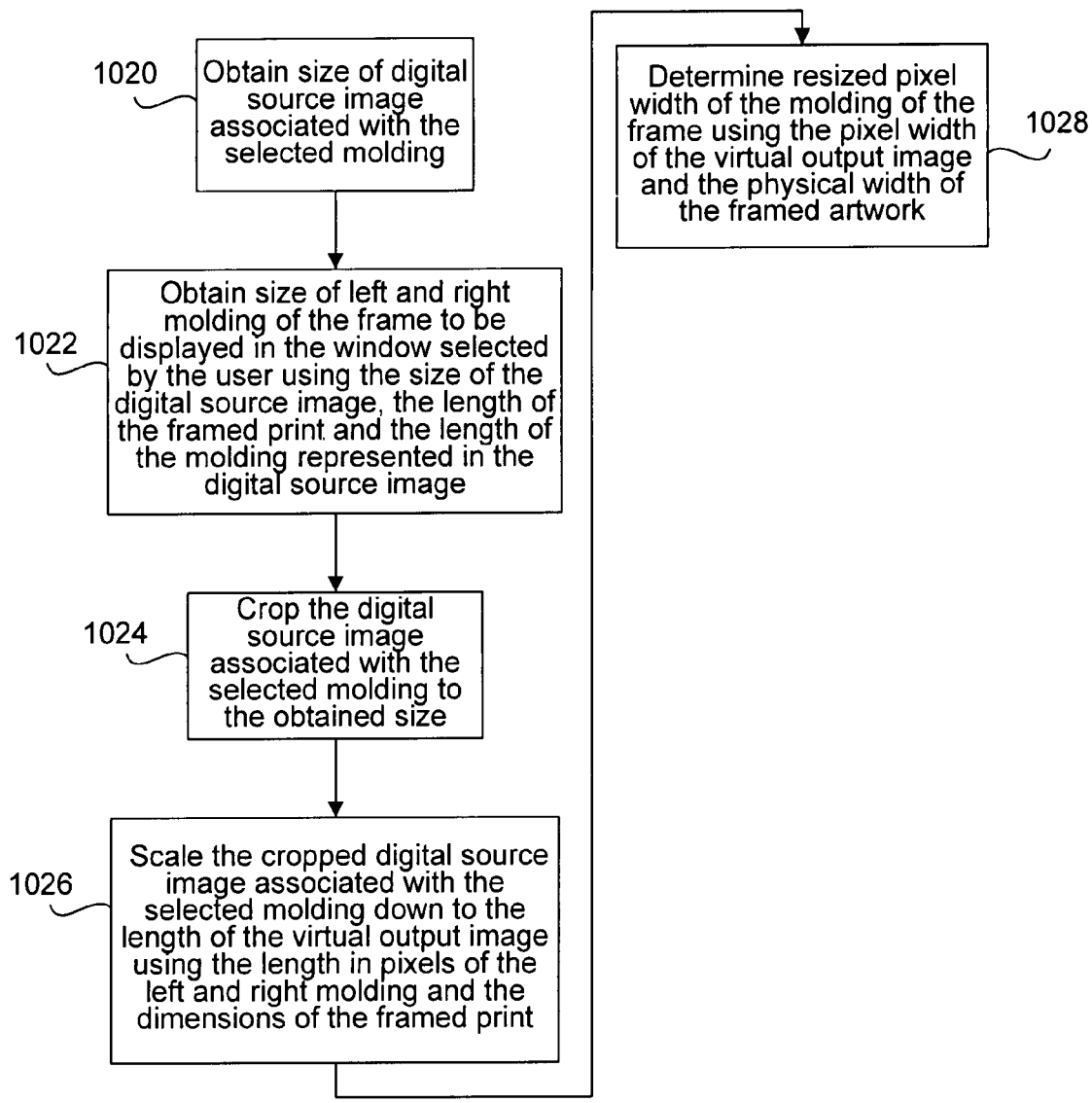
FIG. 10B is a process flow diagram illustrating an example method of determining a molding length to be displayed as the left and right molding of a frame.

FIG. 10B is a process flow diagram illustrating an example method of determining a molding length to be displayed as the left and right molding of a frame. The size of the digital source image associated with the selected molding (e.g., left or right molding) may be obtained at 1020. The cropped size of the left and right molding of the frame may be obtained at 2022 using the size of the digital source image, the physical height of the framed print and the length of the molding represented in the digital source image. The digital source image associated with the selected molding may be cropped to the obtained size at 1024. The cropped digital source image associated with the selected molding may also be scaled down to the height of the virtual output image at 1026. The resized pixel width of the molding of the frame may be determined using the pixel width of the virtual output image to be displayed and the physical width of the framed artwork at 1028.

Figure 11:
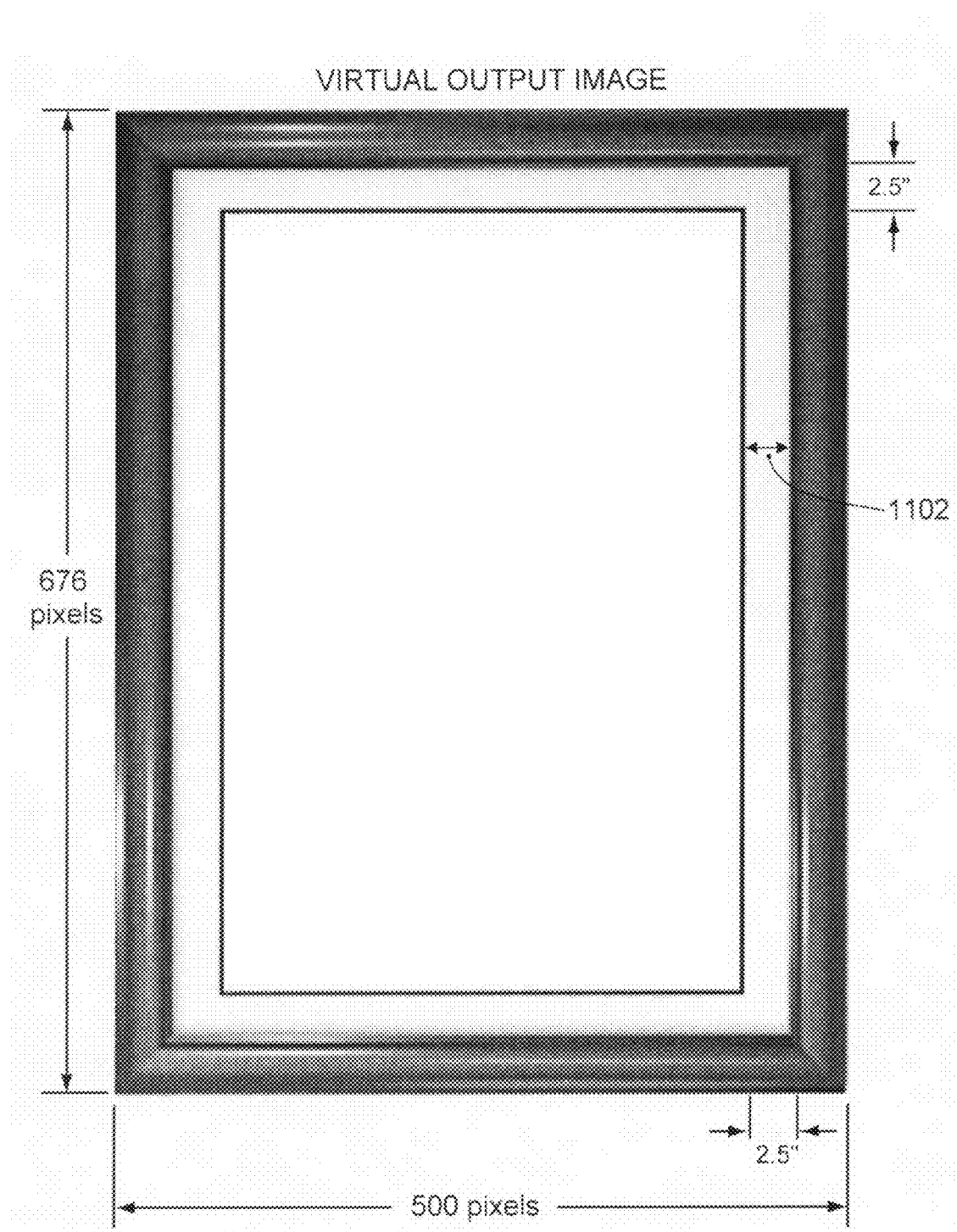
FIG. 11 is a diagram illustrating an example of matting that may be displayed within an area defined by a frame.

FIG. 11 is a diagram illustrating an example of matting that may be displayed within an area defined by a frame. The width of the matting is shown at 1102. In order to ascertain the pixel width of a top and bottom mat having a physical revealed width of 2.5 inches, the physical revealed width of the mat may be multiplied by the ratio of the pixel height of the virtual output image to the physical height of the framed print. In this example, the pixel width of the top and bottom mat is (2.5 inches)×(676 pixels/46 inches)=36.7 pixels. Similarly, in order to ascertain the pixel width of a left and right mat having a physical revealed width of 2.5 inches, the physical revealed width of the mat may be multiplied by the ratio of the pixel width of the virtual output image to the physical width of the framed print. In this example, the pixel width of the left and right mat is (2.5 inches)×(500 pixels/34 inches) =36.7 pixels.

Figure 12:
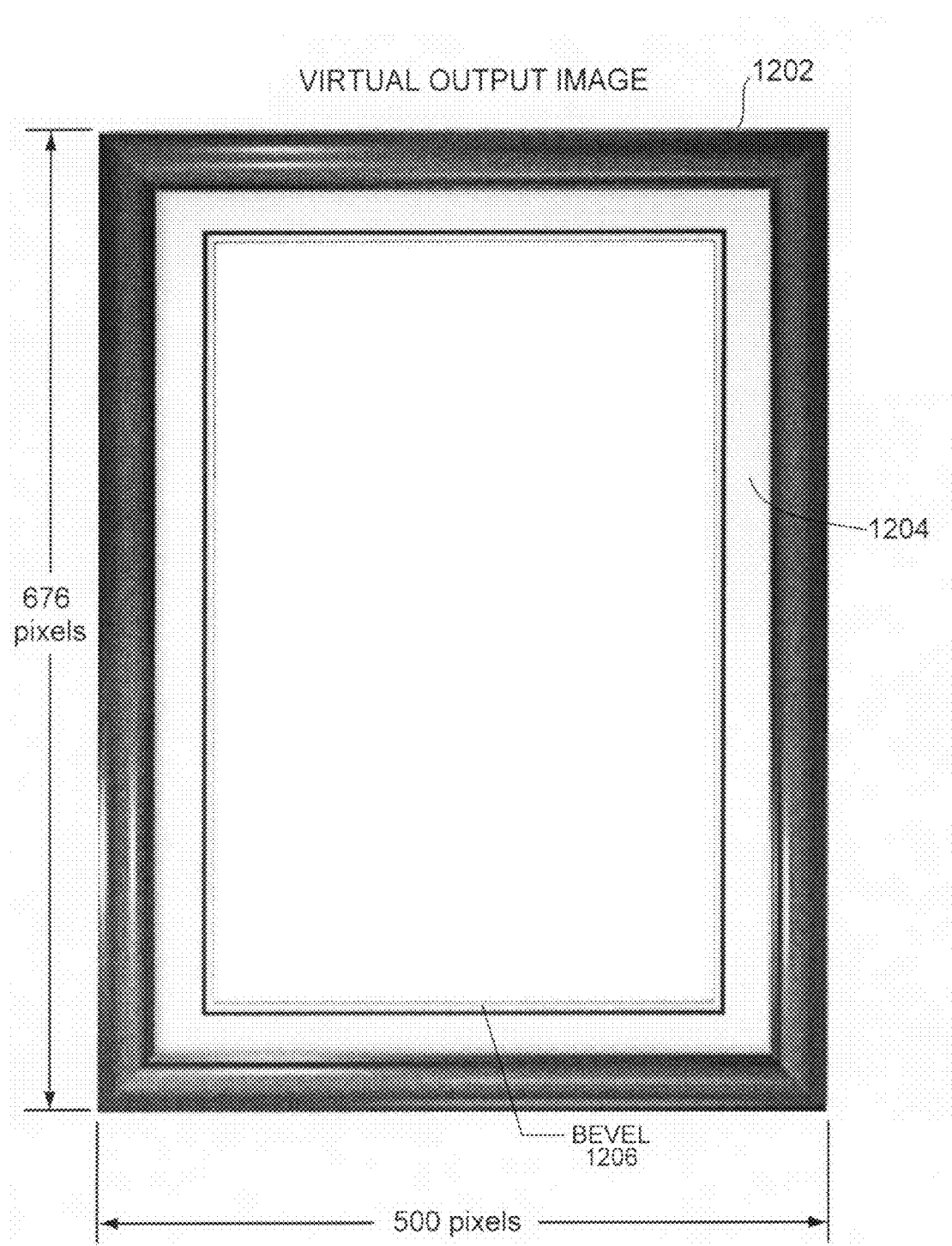
FIG. 12 is a diagram illustrating an example of a virtual output image that may be generated.
Figure 13B:
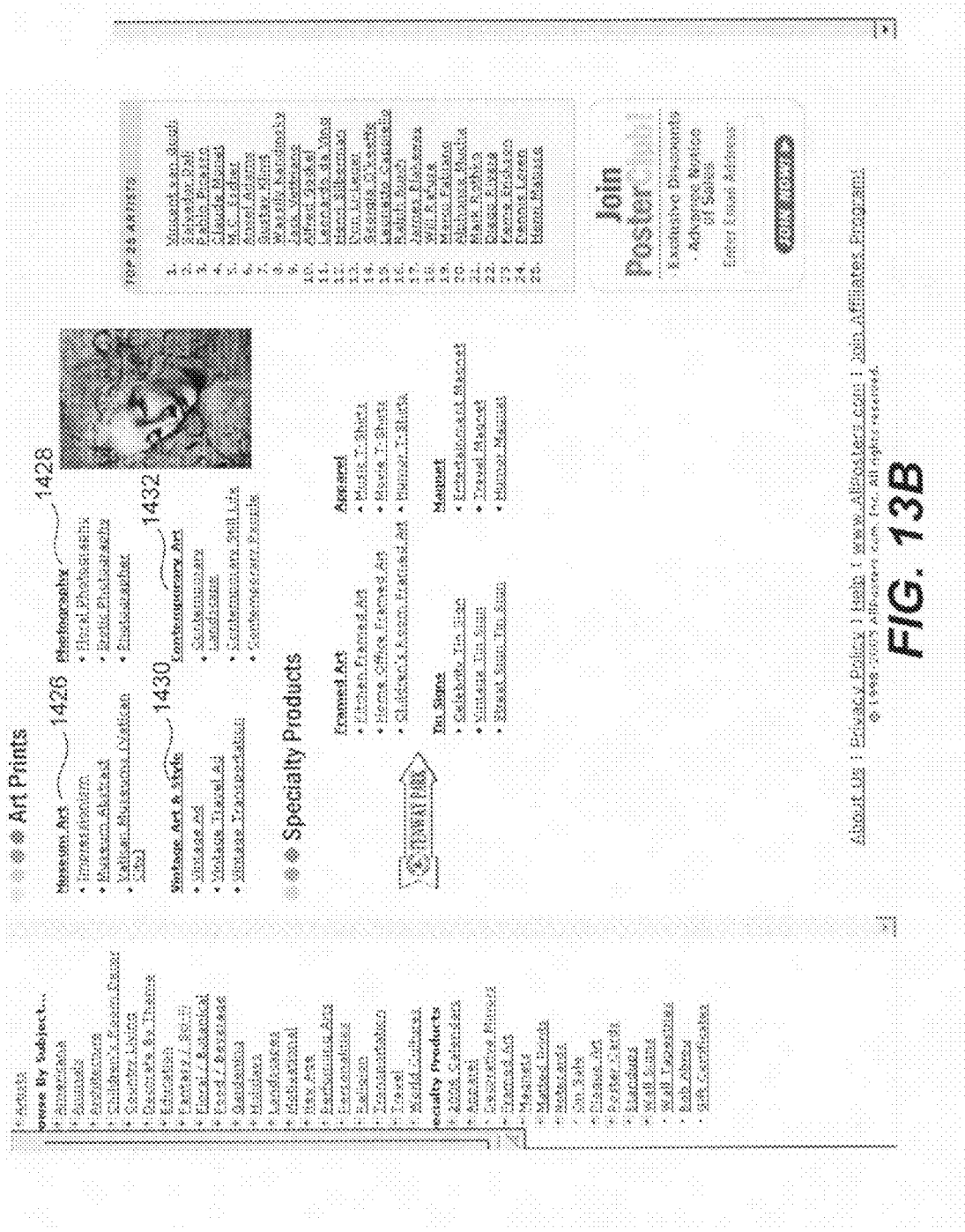

FIG. 12 is a diagram illustrating an example of a virtual output image that may be generated. The virtual output image is shown to include frame 1202. In addition, a mat 1204 is also displayed, along with bevel 1206. In order to simplify the illustration, a print is not shown. The measurements of the resulting output image that is displayed in this example is 500 pixels×676 pixels, as shown. In addition, highlighting and/or shadowing are shown. More particularly, shadowing and/or highlighting are shown to be present in portions of the mat and bevel in this example. Shadowing and/or highlighting may also be applied to a background surrounding the displayed frame. FIGS. 13A-B together illustrate an example of a screen shot of a web site that may be used to view and purchase framed artwork displayed in accordance with the disclosed embodiments. By accessing the web site, a user may view, select, and purchase artwork, which may then be framed. A user may select artwork in a variety of categories, such as Entertainment 1402, Art 1404, or Browse By Subject 1406 such as Animals or Architecture. Examples of sub-categories include Fine Art 1408, Music 1410, Movies 1412, and Photography 1414. In this example, a user may view Entertainment Posters 1416, which may include sub-categories such as Movies 1418, Music 1420, Sports 1422, Humor 1424, Museum Art 1426, Photography 1428, Vintage Art & Style 1430, and Contemporary Art 1432.

In one embodiment, the virtual frame studio is provided as part of a retail website executing on a networked computer system that displays and sells artwork, such as posters and photographs, over a communication network to a user's terminal, typically over the Internet. More particularly, the computer system may be accessed over the Internet by using the URL address for the website. The posters and artwork may be loaded onto the Art.com website beforehand so that the users can search and view the posters and artwork available for sale.

Figure 14:
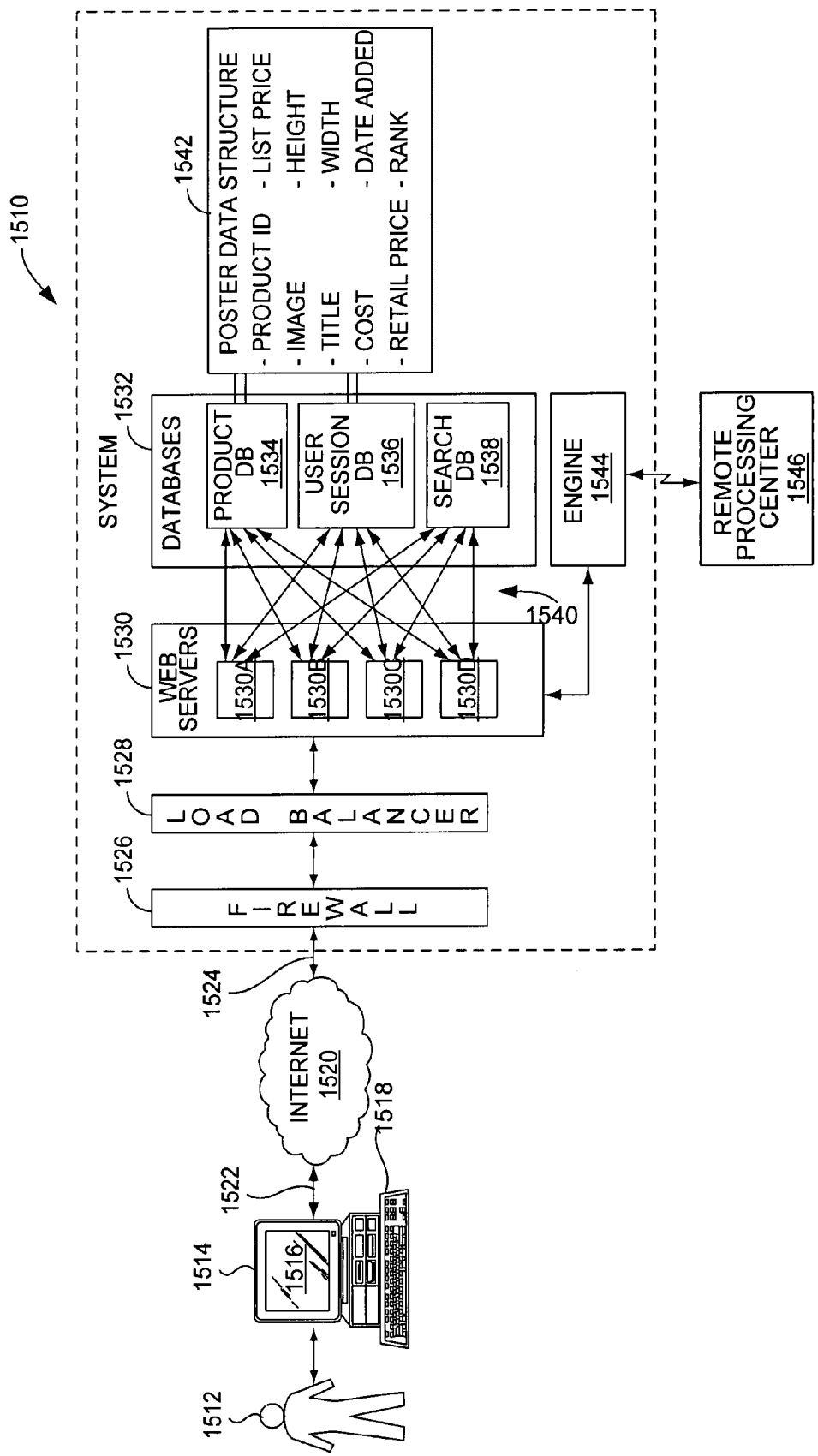
FIG. 14 is a diagram illustrating an example of a system in which the disclosed embodiments may be implemented.

FIG. 14 is a diagram illustrating an example of a system in which the disclosed embodiments may be implemented. More particularly, FIG. 14 illustrates an example communication architecture of the Art.com system 1510, also called "Art.com website," whereby a user or artist 1512 can access the website via the Internet to conduct transactions. As illustrated in FIG. 15, a user 1512 may interact with a computing device or computer 1514. The computer 1514 may include a processor and a display 1516 via which an Internet browser may display information received over the Internet 1520. Similarly, the user 1512 may interact with the computer 1514 to send information out over the Internet 1520. The user 1512 may provide input to the computer 1514 via a keyboard 1518 or other input device. The computer 1514 may be coupled to the Internet 1520 via a communication link or communications network 1522 to accomplish data packet transfer using a protocol such as hypertext transfer protocol (HTTP). Messages sent by the computer 1514 over the Internet 1520 that are destined for the Art.com IP address associated with the web site may be received by the Art.com system 1510 over communication link 1524, as illustrated in FIG. 14.

A data packet sent by the computer 1514 that is received by the Art.com system 1510 may first encounter a firewall 1526 to provide security and limited access into the Art.com system 1510 from the Internet 1520. The data packet may next be communicated to a load balancer 1528 that then directs the data packet message to one of a plurality of redundant web servers 1530. As illustrated in FIG. 15, four web servers are shown, web servers 1530A, 1530B, 1530C, 1530D. In this manner, the Art.com system 1510 may have sufficient computing power to handle traffic from a plurality of computers 1514 simultaneously. Any number of web servers 1530 may be provided. The web servers 1530 may be coupled to various databases 1532 that are part of the Art.com website and system 1510.

The databases 1532 in the Art.com system 1510 may include a product database 1534, a user session database 1536, and a search database 1538. The web servers 1530 may be communicatively coupled to these databases 1532 via communication links 1540. These communication links 1540 may be provided between every web server 1530 and every database 1532 so that each web server 1530 is able to communicate with any database 1532 for operation of the system. The web servers 1530 may contain the logic and corresponding computer-readable instructions that generate the web pages sent by the Art.com system 1510 to the user's computer 1514 for display to the user 1512 over the Internet 1520. The web servers 1530 may access the databases 1532 to retrieve information about posters and artwork that are available for display, framing, and purchasing by the user 1512 via the Art.com system 1510.

The user session database 1536 may be used to store an instance of an ongoing session established by the user 1512 with the web server 1530. The product database 1534 may contain information about each piece of artwork that is available to be displayed and purchased by the user 12 via interaction with the web server 1530. The search database 1538 may contain cached search results based on the search request made by the web servers 1530 to the product database 1534. The web servers 1530 may check the search database 1538 in response to a search request by the user 1512 to determine if the search request desired is already stored in the search database 1538. In this manner, the web server 1530 may be able to more quickly execute search requests by the user 1512.

The product database 1534 and/or the search database 1538 may contain artwork data structures 1542 that contain information about each poster or artwork available for display, framing, and purchase by the user 1512 via interaction with the Art.com system 1510. The artwork data structure 1542 may include a product ID for the poster or artwork that is used to uniquely store each poster or artwork that is available for purchase in the databases 1532. The artwork data structure 1542 may also contain an image file name that is a file containing a representative graphic digital image of the artwork that may be sent to the user's 1512 computer 1514 for display. The artwork data structure 1542 may also contain a title, corresponding artist, cost, retail price and/or list price of a poster or artwork to be used by the web server 1530 for various operations of the Art.com system 1510. The artwork data structure 1542 may also include digital image size information indicating the size of the digital image, and the physical dimensions of the actual artwork such as the height and width of the artwork. This information may support sorting based on the height and width of the poster or artwork.

The artwork data structure 1542 may also include the date that the artwork was added to the Art.com system 1510 and made available for access by the user 1512, as well as a rank field that is indicative of which posters are ordered more often by users 1512. The web server 1530 may also be coupled to an engine 1544 that directs messages from the Art.com system 1510 to a remote processing center 1546 for payment. The remote processing center 1546 may be used for processing of credit or debit card accounts so that the user 1512 can use his or her credit or debit card account for purchasing posters and artwork. The user's 1512 account information may be transmitted to the engine 1544 and then to the remote processing center 1546 to charge the user's 1512 account for purchases.

It is important to note that the disclosed embodiments are not limited to the computer system described above with reference to FIG. 5. Rather, the disclosed embodiments may be implemented via any computer system, including but not limited to a kiosk or website that allows users to access and review artwork and provide and view custom selections for framing of such artwork. Moreover, the disclosed embodiments may be employed in on-site computer terminals or kiosks in framing shops, or retailers that provide framing services.

Although the foregoing embodiments have been described in some detail for purposes of clarity of understanding, it will be apparent that certain changes and modifications may be practiced within the scope of the appended claims. For instance, a default setting indicating a molding type may be global (e.g., with respect to all prints), or may be specific to a particular print. Similarly, a default setting associated with a molding type or print may be applied to all users, or may be specific to a particular user. Therefore, the described embodiments should be taken as illustrative and not restrictive, and the embodiments should not be limited to the details given herein but should be defined by the following claims and their full scope of equivalents.

What is claimed is:

1. A method of displaying a representation of a frame, comprising:

identifying a molding type capable of being used in a frame;

obtaining a set of digital images from a plurality of stored sets of digital images by a processor, wherein each one of the set of digital images represents molding of the molding type in a different one of a plurality of orientations, wherein the plurality of stored sets of digital images correspond to a plurality of molding types; and displaying a representation of the frame using the set of digital images;

wherein identifying a molding type comprises:

identifying a molding type that has been selected from among a plurality of availabe molding types.

2. The method as recited in claim 1, wherein the molding type is identified by at least one of a color, a material, a width, a depth, a pattern, finish, or a texture of the molding.

3. The method as recited in claim 2, wherein the material is metal or wood.

4. The method as recited in claim 1, wherein the set of digital images comprises four digital images and wherein the plurality of orientations comprises four different orientations of a stick of molding of the molding type arranged to depict four sides of a frame, wherein displaying the representation of the frame using the set of digital images comprises:

obtaining at least a segment of the representation of the molding in each of the four digital images.

5. The method as recited in claim 4, wherein displaying the representation of the frame using the set of digital images further comprises:

cropping the segment of the representation of the molding in at least two of the four digital images.

6. The method as recited in claim 5, wherein cropping the segment of the representation of the molding in at least two of the four digital images comprises:

cropping both ends of the segment of the representation of the molding in at least two of the four digital images such that both ends are cut off at a 45 degree angle.

7. The method as recited in claim 5, wherein cropping the segment of the representation of the molding in at least two of the four digital images comprises:

cropping at least one end of the segment of the representation of the molding in at least two of the four digital images such that the cropped end is cut off at a 45 degree angle.

8. The method as recited in claim 4, wherein displaying the representation of the frame using the set of digital images further comprises:

resizing the obtained segment associated with each of the four digital images.

9. The method as recited in claim 1, further comprising:

ascertaining a size of the frame to be displayed;

wherein displaying the frame using the set of digital images is performed corresponding to the ascertained size of the frame.

10. The method as recited in claim 1, wherein obtaining a set of digital images comprises:

obtaining a set of digital images that have been taken under the same lighting conditions.

11. The method as recited in claim 10, wherein the set of digital images have been modified after the set of images were taken.

12. The method as recited in claim 1, further comprising:

obtaining a digital image representing a piece of artwork; and applying at least one of shadowing or highlighting to the digital image representing the piece of artwork such that a representation of the piece of artwork is displayed within an area defined by the frame.

13. The method as recited in claim 12, wherein the at least one of shadowing or highlighting represents at least one of shadowing or highlighting due at least in part to the frame.

14. The method as recited in claim 12, further comprising:
displaying one or more mats within the area defined by the frame such that the representation of the piece of artwork is displayed within an area defined by the one or more mats;
wherein the at least one of shadowing or highlighting represents at least one of shadowing or highlighting due at least in part to at least one of the mats.

15. The method as recited in claim 14, wherein at least one of shadowing or highlighting represents at least one of shadowing or highlighting due at least in part to the frame.

16. The method as recited in claim 12, further comprising:
displaying one or more mats within the area defined by the frame such that the representation of the piece of artwork is displayed within an area defined by the one or more mats;
applying at least one of shadowing or highlighting to one or more of the displayed mats, wherein the at least one of shadowing or highlighting represents shadowing or highlighting due at least in part to the frame.

17. The method as recited in claim 16, wherein at least one of the shadowing or highlighting applied to one or more of the displayed mats represents at least one of shadowing or highlighting due at least in part to another one of the displayed mats.

18. The method as recited in claim 12, further comprising:
displaying one or more mats within the area defined by the frame such that the representation of the piece of artwork is displayed within an area defined by the one or more mats;
applying at least one of shadowing or highlighting to one or more of the displayed mats, wherein the at least one of shadowing or highlighting represents shadowing or highlighting due at least in part to another one of the displayed mats.

19. The method as recited in claim 1, further comprising:
applying at least one of shadowing or highlighting to the displayed frame.

20. The method as recited in claim 1, further comprising:
displaying one or more mats within the area defined by the frame; and
applying shadowing to an interior side of an inner one of the mats.

21. The method as recited in claim 1, further comprising:
applying at least one of shadowing or highlighting to a background surrounding the displayed frame.

22. The method as recited in claim 1, the set of digital images each comprise a photograph of a piece of molding taken over substantially the entire length of the piece of molding.

23. The method as recited in claim 22, wherein the set of digital images comprise photographs of molding having an aspect ratio of at least about 3.

24. The method as recited in claim 1, further comprising:
obtaining a digital representation of a piece of artwork;
applying by a processor at least one of shadowing or highlighting to the digital representation of the piece of artwork to generate a modified digital representation of the piece of artwork; and
displaying the modified digital representation of the piece of artwork;
wherein at least one of the shadowing or highlighting represents at least one of shadowing or highlighting due at least in part to the frame.

25. The method as recited in claim 1, further comprising:
obtaining a digital representation of a piece of artwork;
applying by a processor at least one of shadowing or highlighting to the digital representation of the piece of artwork to generate a modified digital representation of the piece of artwork; and
displaying the modified digital representation of the piece of artwork;
wherein at least one of the shadowing or highlighting applied to the piece of artwork represents at least one of shadowing or highlighting due at least in part to one or more mats, the method further comprising:
displaying the one or more mats within an area defined by the frame such that the piece of artwork is displayed within an area defined by the one or more mats.

26. The method as recited in claim 25, further comprising:
applying at least one of shadowing or highlighting to at least one of the displayed mats such that at least one of the one or more mats that are displayed include at least one of shadowing or highlighting.

27. The method as recited in claim 26, wherein at least one of the shadowing or highlighting applied to at least one of the displayed mats represents at least one of shadowing or highlighting due at least in part to the frame.

28. The method as recited in claim 26, wherein at least one of the shadowing or highlighting applied to at least one of the displayed mats represents at least one of shadowing or highlighting due at least in part to another one of the mats.

29. The method as recited in claim 1, further comprising:
obtaining a digital representation of a piece of artwork;
applying by a processor at least one of shadowing or highlighting to the digital representation of the piece of artwork to generate a modified digital representation of the piece of artwork;
displaying the modified digital representation of the piece of artwork; and
applying at least one of shadowing or highlighting to the represention of the frame.

30. An apparatus for displaying a representation of a frame, comprising:
a processor; and
a memory, at least one of the processor or the memory being adapted for:
identifying a molding type capable of being used in a frame;
obtaining a set of digital images from a plurality of stored sets of digital images,
wherein each one of the set of digital images represents molding of the molding type in a different one of a plurality of orientations, wherein the plurality of stored sets of digital images correspond to a plurality of molding types; and
displaying a representation of the frame using the set of digital images; wherein identifying a molding type comprises:
identifying a molding type that has been selected from among a plurality of available molding types.

31. An apparatus for displaying a representation of a frame, comprising:
means for identifying a molding type capable of being used in a frame;
means for obtaining a set of digital images from a plurality of stored sets of digital images, wherein each one of the set of digital images represents molding of the molding type in a different one of a plurality of orientations, wherein the plurality of stored sets of digital images correspond to a plurality of molding types; and means for displaying a representation of the frame using the set of digital images; wherein identifying a molding type comprises:

identifying a molding type that has been selected from among a plurality of available molding types.

32. The method as recited in claim 1, wherein the set of digital images comprises photographs of molding of the molding type.

33. The method as recited in claim 32, wherein each digital image of the set of digital images includes a photograph of the molding in a different one of the plurality of orientations.

34. The method as recited in claim 1, wherein the set of digital images comprises four digital images and wherein each of the plurality of orientations comprises a corresponding one of four different orientations of a stick of molding of the molding type, wherein the plurality of orientations are arranged such that a combination of the plurality of orientations depicts four sides of a frame.

35. A method of displaying a representation of a frame, comprising:

identifying a molding type capable of being used in a frame;

obtaining a set of digital images by a processor, wherein each one of the set of digital images represents molding of the molding type in a different one of a plurality of orientations; and displaying a representation of the frame using the set of digital images;

wherein identifying a molding type comprises:

identifying a molding type that has been selected from among a plurality of available molding types;

wherein the set of digital images comprises photographs, wherein the photographs have been taken under a set of lighting conditions such that the photographs include lighting effects resulting from the set of lighting conditions.

36. The method as recited in claim 35, wherein the representation of the frame that is displayed includes lighting effects resulting, at least in part, from the set of lighting conditions.

37. The method as recited in claim 36, wherein the lighting effects include at least one of shadowing effects or highlighting effects.

* * * * *